(12) United States Patent
Hancock

(10) Patent No.: US 10,585,963 B2
(45) Date of Patent: *Mar. 10, 2020

(54) SYSTEMS AND METHODS FOR INTERNET SEARCHING

(71) Applicant: WGRS Licensing Company, LLC, Newport Beach, CA (US)

(72) Inventor: S. Lee Hancock, Newport Beach, CA (US)

(73) Assignee: WGRS Licensing Company, LLC, Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/298,986

(22) Filed: Mar. 11, 2019

(65) Prior Publication Data

US 2019/0205347 A1 Jul. 4, 2019

Related U.S. Application Data

(63) Continuation of application No. 11/735,421, filed on Apr. 13, 2007, now Pat. No. 10,229,216.

(Continued)

(51) Int. Cl.
*G06Q 30/00* (2012.01)
*G06F 16/955* (2019.01)
(Continued)

(52) U.S. Cl.
CPC .......... *G06F 16/955* (2019.01); *G06F 16/951* (2019.01); *G06Q 30/00* (2013.01);
(Continued)

(58) Field of Classification Search
CPC . G06F 16/955; G06F 16/951; G06Q 30/0274; G06Q 30/0275; G06Q 30/0256; G06Q 30/00
(Continued)

(56) References Cited

U.S. PATENT DOCUMENTS 6,629,092 B1 * 9/2003 Berke .................. G06F 16/951
707/706
7,225,151 B1 * 5/2007 Konia .................. G06Q 30/08
705/26.3

(Continued)

FOREIGN PATENT DOCUMENTS

WO WO0225514 A2 * 3/2002 ............. G06F 17/60

*Primary Examiner* — Luis A Brown
(74) *Attorney, Agent, or Firm* — William A. English; Vista IP Law Group LLP

(57) ABSTRACT

Systems and methods are provided for a brand search ecosystem accessed via a network including a database of brands and branded products, locations, features, and services with input on business rules, algorithms, and information from brandholders and/or providing economic incentive payments to participants in the brand search ecosystem. The brand search ecosystem includes a brand name database including a plurality of brands and brandholders and brandbidders associated with respective brands. A search engine communicates with brandholders and the brand name database via a network for accessing information of brandholders and the brand name database to identify brandholders and brandbidders associated with brands. The search engine receives search requests from users, accesses the brand name database, and provides search results to the users. A clearing house processes economic incentive payments to brandholders and/or brandbidders associated with brands in the database.

23 Claims, 8 Drawing Sheets

Related U.S. Application Data

(60) Provisional application No. 60/744,804, filed on Apr. 13, 2006.

(51) Int. Cl.
*G06Q 30/02* (2012.01)
*G06F 16/951* (2019.01)

(52) U.S. Cl.
CPC ..... *G06Q 30/0256* (2013.01); *G06Q 30/0274* (2013.01); *G06Q 30/0275* (2013.01)

(58) Field of Classification Search
USPC .......... 705/14.1, 14.39, 14.54, 14.69, 14.71, 705/14.73
See application file for complete search history.

(56) References Cited

U.S. PATENT DOCUMENTS

| | | | |
|---|---|---|---|
| 7,319,976 B1* | 1/2008 | Peckover | G06Q 30/02 705/14.36 |
| 7,577,582 B1* | 8/2009 | Ojha | G06Q 30/06 705/26.3 |
| 7,630,986 B1* | 12/2009 | Herz | G06Q 10/10 |
| 7,904,327 B2* | 3/2011 | Phelan | G06Q 30/02 705/14.18 |
| 2002/0169676 A1* | 11/2002 | Floyd | G06Q 30/02 705/26.62 |
| 2003/0182413 A1* | 9/2003 | Allen | G06Q 30/06 709/223 |
| 2004/0133471 A1* | 7/2004 | Pisaris-Henderson | G06Q 30/02 705/14.41 |
| 2004/0199397 A1* | 10/2004 | Dresden | G06Q 30/02 705/1.1 |
| 2005/0086112 A1* | 4/2005 | Shkedi | G06Q 30/02 705/14.61 |
| 2005/0097024 A1* | 5/2005 | Rainey | G06Q 30/02 705/37 |
| 2006/0190333 A1* | 8/2006 | Choi | G06Q 30/02 705/14.51 |
| 2007/0077981 A1* | 4/2007 | Hungate | G06Q 20/20 463/16 |
| 2007/0179848 A1* | 8/2007 | Jain | G06Q 30/02 705/14.27 |
| 2007/0179856 A1* | 8/2007 | O'Kelley | G06Q 30/0247 705/14.46 |
| 2007/0244797 A1* | 10/2007 | Hinson | G06Q 30/08 705/37 |
| 2007/0260514 A1* | 11/2007 | Burdick | G06Q 30/02 705/14.46 |
| 2007/0288351 A1* | 12/2007 | Huntley | G06Q 40/04 705/37 |
| 2008/0040229 A1* | 2/2008 | Gholston | G06Q 30/0235 705/14.35 |
| 2008/0097872 A1* | 4/2008 | Peckover | G06Q 30/02 705/26.43 |
| 2008/0103898 A1* | 5/2008 | Flake | G06Q 30/02 705/14.41 |
| 2008/0103903 A1* | 5/2008 | Flake | G06Q 30/02 705/14.41 |
| 2009/0069078 A1* | 3/2009 | Nguyen | G06Q 20/20 463/25 |
| 2009/0271267 A1* | 10/2009 | Moukas | G06Q 10/0631 705/14.48 |
| 2010/0057556 A1* | 3/2010 | Rousso | G06Q 30/02 705/14.44 |

* cited by examiner

First Page of Search Results for Google Search on the Search Term "Marriotts Shadow Ridge" on April 9, 2006

SYSTEMS AND METHODS FOR INTERNET SEARCHING

This application is a continuation of application Ser. No. 11/735,421, filed Apr. 13, 2007, issuing as U.S. Pat. No. 10,229,216, which claims benefit of provisional application Ser. No. 60/744,804, filed Apr. 13, 2006, the entire disclosures of which are expressly incorporated by reference herein.

FIELD OF THE INVENTION

This invention relates to systems and methods for finding and/or displaying information of various types via a network, such as the Internet, and other electronic and digital searches and/or media displays and communications.

BACKGROUND

The Internet has become a new medium for finding and/or displaying information of all types, including information about products, services, and locations. The most common process through which information on the Internet (collectively referred to as "Content") is discovered is using Internet Search Engines ("Search Engines"). Content includes but is not limited to all information, communications, media, leaders, websites, images, tags, meta tags, domain names, applications, and the like, whether displayed on or through the Internet or through other methods and media. Search Engines are typically operated by major Internet companies ("Search Companies") that specialize or provide internet search ("Internet Search" or "Search") as all or a portion of their content and value to internet users, such as Google, Yahoo, and MSN. Search Companies operate Search Engines in order to present Internet users ("Internet Users") relevant information ("Search Results") on search engine results pages and other Internet pages. It is projected that Internet Users in the United States alone will exceed one hundred fifty million by 2007. Internet Search has created several new industries described below, yet it is still in its infancy, and, for a variety of reasons, Internet Search is arguably less effective today than it was a few years ago.

As discussed in more detail below, Search Companies face many new and daunting challenges trying to ensure that their Search Engines provide Internet Users relevant and compelling Search Results. These challenges include: a) the prolific, exponential growth in both the depth and breadth of Content, b) the rapid pace of changing Content, c) the difficulty of interpreting (or parsing) search requests ("Search Requests") by a variety of Internet Users, d) the depth, breadth and dynamic nature of terms, keywords, phrases, and/or other search terms ("Search Terms") used in Search Requests, e) the rapidly changing lexicography of words compounded by multiple languages, dialects, slang terms, and colloquialisms, f) the need to develop and maintain a taxonomy of Search Terms, and g) the increase in the number and complexity of Content pages that are generated dynamically instead of containing static, and more easily crawlable and/or indexable Content.

All of these challenges associated with providing relevant and optimized Search Results are magnified by the sheer vastness of the economics involved in this rapidly changing medium and the potential economic rewards of both legitimate and illegitimate use, misuse, and/or manipulation of Search Results. The vastness of the economic rewards may be illustrated by Google, which has developed a one hundred billion dollar market capitalization, making it one of the most valuable companies in the world in just a few years.

Even without the magnitude of revenues and market capitalization that may be earned by Search Companies, the incentive and temptation of enterprising companies and individuals to legitimately or illegitimately impact and manipulate Search Results to their economic advantage is tremendous. First, virtually all Search Companies have devised systems whereby they share a portion of the revenues they derive from Paid Search Results (as defined below) with companies and persons (collectively "Affiliates") who display the Paid Search Results, and these Affiliates may make millions from merely displaying the Paid Search Results on their pages that generate paid clicks, calls, and activities that trigger a charge for Paid Advertising, or other monetizable actions (collectively "Monetizable Actions"). Affiliates may make substantial sums by merely getting Internet Users to their sites and having the Internet User click-through on Paid Search Results, i.e., "click" or otherwise select Content or an active icon, e.g., on a webpage, that forwards the user directly to a website or other location (referred to herein as a "click-through"). Second, Internet commerce has become a multi-billion dollar industry where Internet traffic drives sales and revenues for Internet companies. It is extremely valuable to get a targeted or even "ready-to-buy" Internet User/buyer to a website to purchase goods and services on the website, or to be able to refer the Internet User/buyer to vendors as a qualified lead. Third, more and more non-Internet commerce is originated and transacted on, or significantly influenced by, Content found and reviewed on the Internet, whether in connection with Search Results or otherwise. Therefore, getting Internet Users to visit an enterprise's website to make Internet purchases or ultimately influence non-Internet purchases through advertising or Content on the website may be tremendously valuable.

Efforts by clever website operators and their advisors and consultants to elevate their sites and Content in Search Results and/or otherwise capitalize or exploit inefficiencies or loopholes in the current Internet Search ecosystem has and may remain an additional and significant challenge to Internet Users, advertisers, and Search Companies. All of these challenges combine to support the position that Search Results today are tremendously more voluminous, obtuse, and manipulated, which results in less accurate and usable Search Results than just a few short years ago. Furthermore, there are some inherent shortcomings in the current Internet Search ecosystem that, until resolved or mitigated, are likely to cause the problems to continue and grow, likely causing the system to become more and more inefficient and/or distorted and inhibiting or perhaps even effectively thwarting various improvements to the system.

One of the increasingly popular types of Internet Searches are local Internet searches ("Local Searches") that are focused on finding local stores, products, and/or information near a specific location, usually near the Internet User conducting the Search. In most cases, these types of Internet Users are seeking information about where to buy products and services at stores near where the Internet Users are or are going to be. Location adds a new element to Internet Searches, and Search Companies are just now focusing on the unique nature and challenges of Local Searches.

In addition to Search Requests conducted by Internet Users through personal computers and other full-sized computer terminals ("PCs"), there has been a prolific growth in the number of Internet Users who are accessing or viewing Content (or using programs and applications that are accessing Content) from non-PC computing devices, including mobile phones, televisions, vehicle navigation systems, kiosks, lobby and elevator monitors and displays, and the like. (collectively, "Non-PC Devices"). Many of these Non-PC Devices have limited keyboard input and/or are used in cases where typing and inputting Search Requests are difficult and/or reviewing numerous Search Results is impossible or ineffective.

Over the past several years, the volume of Content available on the Internet and through other forms of media has increased exponentially due to the proliferation of low-cost digital media and its availability to the masses because of its extreme portability. Regarding the display of Content in connection with Internet Searches, several methods have been developed by Internet Search Companies to facilitate Internet Searches. These methods generally fall into two broad categories. The first type of Search Results is algorithmically derived by the application of various business or search rules that are determined by the Search Company ("Organic Search Results"). The second type of Search Results is Search Results that are based on paid, bidded, or "sponsored" links and placements ("Paid Search Results"). The inclusion and order of Paid Search Results are typically determined by Search Companies through the application of various business or Paid Search Results rules that are determined by the Search Company. These rules are typically driven by the prices bid by various Content providers desiring to have their Content associated with Paid Search Results, and over the years Search Companies have developed various rules that are variously and/or ostensibly designed to enhance the nature and quality of the Paid Search Results provided to the User and/or to maximize the revenue generated to the Search Company through the quantity and value of click-throughs to the Paid Search Results. The original goal of both of these types of searches was to deliver Internet Users relevant Content and/or hyperlinks to Internet Content, but over the years the vastness of Internet Content has made it increasingly difficult to meet this goal.

Organic Search Results are typically determined by the Search Companies analyzing Internet Content contained in the indexes they have created from crawling and spidering millions of Internet websites and Content and then providing Internet Users Search Results including websites and Content that are designed to match their Search Requests.

Most Search Engines support the use of descriptors and embedded instructions that can be used by sophisticated Internet Users to refine their Search Requests. Examples may include using Boolean terms like AND, OR, and NOT between Search Terms, and even advanced search logic, e.g. allowing an Internet User to specify the desired distance between two or more Search Terms. Such terms are referred to herein as "Search Logic Terms."

Although there may be millions of pages of Internet Content that include particular words and phrases that are Indexed by the Search Companies, some Internet pages will have more relevant information and/or be more popular or useful than other pages. Many Search Engines use various methods of determining the order in which Organic Search Results are displayed, and it is believed in the industry that major Search Engines may consider as many as one hundred fifty different factors in ranking Organic Search Results for Internet Users. These factors, their relevant weight, and the rules associated with their use vary from Search Company to Search Company, change and evolve significantly over time, and in many cases are kept secret from Internet Users and website operators. Part of the effectiveness of these factors is their secrecy, and in fact part of the proprietary assets of Search Companies are the various rules they use to determine Organic Search Results.

When an Internet User inputs Search Terms in a Search Request to describe a desired Internet Search, Search Companies typically attempt to parse and interpret the Search Terms to provide relevant Search Results. It is common today for Internet Search Companies to merely provide Internet Users with an open box within which to type in a Search Request, although many companies provide links and menus of various levels and degrees of sophistication to make it easier, quicker, or more effective for Internet Users to indirectly find what they are looking for by submitting a Search Request related to a link or item from the menu.

Even with the use of Search Logic Terms, parsing Search Terms from an open box Search Request creates numerous difficulties because of the numerous possible interpretations of the Search Requests. Search Companies use sophisticated algorithms ("Search Algorithms") to interpret the Search Requests, but because of the proliferation of Content and Internet Users, it has become increasingly difficult to do so effectively.

Internet Search Companies typically do not disclose the formulas and criteria by which they determine Organic Search Results, and they typically try to obscure and continuously revise and alter Search Algorithms, but Search Engine Optimization companies ("SEOs") described below and others are very adept at efforts to improve their inclusion and ranking in Organic Search Results. Of course, the more SEOs and others attempt to alter Organic Search Results to their benefit, the more the Search Companies revise their Search Algorithms and attempt to neutralize the unjustified efforts of SEOs, which of course then causes the SEOs to adjust their techniques, resulting in a never ending cycle of action/reaction. The net result of all of this is that Organic Search Results may become distorted and are often far from optimal. Importantly, Search Companies today typically guard their Search Algorithms carefully, and to date it does not appear that Search Companies enlist the support and cooperation (formally or informally) of other parties in the initial or ongoing design, development, implementation, and modification of their Search Algorithms.

Paid Search Results are typically determined by the Search Companies by providing Internet Users with Content links, listings, and/or advertising that, while responsive to Search Requests, are primarily determined by the amounts that Advertisers are willing to pay to be included and ranked high in response to Search Requests. The amounts that Advertisers are willing to pay are often referred to and will be referred to herein as "Bids" or the "Bid Price" per Monetizable Action. Paid Search Results often appear in Search Results under the phrase "Sponsored Results," where they are typically displayed above Organic Search Results. An advertising product and system closely related and similar to Paid Search may use a system similar to Paid Search Results for purposes of acquiring, storing, and displaying paid, bidded, or sponsored search advertising ("Paid Advertising", and together with Paid Search Results, "Paid Search Results").

While Paid Advertising is often displayed at or near Search Results, Paid Advertising is also often displayed directly on Internet Content separate from Search Results. Search Companies attempt to increase the value of the Paid Advertising by requiring that the Paid Advertising be related to certain categories covered by the Content with which it is displayed. Although not technically displayed as a result of an Internet Search, the system of acquiring, bidding, and delivering Paid Advertising works in a manner very similar to the systems associated with delivering Paid Search Results, and Paid Advertising is often sold and managed in systems that are intimately and seamlessly integrated with Paid Search Results and shares many of the challenges of Paid Search Results.

Paid Search Results are included, ordered and prioritized, or otherwise impacted by the payments or "Bids" placed by the Advertisers ("Bidders") to associate their Content with certain Search Terms included in Search Requests. Payments by Advertisers for these types of advertising typically take the form of pay per click, pay per call, and other forms of pay for performance advertising (collectively referred to herein as "Pay for Performance Advertising"). In these Pay for Performance Advertising systems, Advertisers may Bid any amount that they are willing to pay to increase the ranking of their Content included and displayed in Paid Search Results. The overall results of the combination of Paid Search Results and Pay for Performance is a very robust and competitive "Pay to Play" advertising environment and Paid Search Results ecosystem that has allowed Search Companies to leverage their position and drive tremendous Paid Search Results revenues and profits in just a few years.

It is clear that a significant goal of Search Companies vis-à-vis Internet Searches in recent years has been to maximize the revenues derived from Paid Search Results. In fact, one well-known Search Company derived ninety nine percent (99%) of its revenues from Paid Search Results and Paid Advertising. Interestingly, despite the numerous factors used by Search Companies to provide relevant Organic Search Results, there is essentially one dominant factor that controls the ranking of Paid Search Results—how much money the Advertiser is willing to spend. The efforts and number of factors applied to determine and optimize Paid Search Results are extremely limited and typically focus on the amount Bid by Advertisers and the quantity and value of revenues driven by "click-throughs." Although various Search Companies have begun various methods of adjusting their paid Search Algorithms and procedures to add other factors into the determination of Paid Search Results, the number and nature of these efforts and factors are dwarfed by the efforts and factors applied to Organic Search Results.

Search Companies may apply various Search Algorithms and metrics other than the amount Bid by a Paid Advertising Advertiser to determine the order of Paid Search Results, but it appears that oftentimes these algorithmically derived adjustments to Paid Search Results are not focused so much on delivering more relevant and meaningful responses to a Search Request, but rather are focused on maximizing the total revenues (typically the quantity of Monetizable Actions generated times the Bid Price per Monetizable Actions) derived by the Search Company, thereby further distorting and biasing the relevancy of the Search Results delivered to the Internet User. This is one of the most pervasive problems with Paid Search Results. In the short-run, Search Companies are tremendously disincented to display or rank Paid Advertising in any manner other than the order that will maximize the Search Companies revenues and income, namely, the order that will drive the most clicks at the highest prices.

Because crawling Internet Websites to assist in providing Organic Search Results may be slow and take significant time to discover, index, and include Content in Search Results, many Search Companies allow Content providers to pay to have their websites included in Organic Search Results ("Pay for Inclusion"). While not typically affecting ranking of results, Pay for Inclusion is another way that Search Companies make money from Advertisers desiring to ensure that their Content is included in Search Results.

Optimizing the exposure of websites and other Content on Search Results pages displaying Organic Search Results has created a new industry referred to as Search Engine Optimization ("SEO"), and numerous SEO companies ("SEOs") specialize in improving the inclusion and ranking of their customers' websites in Organic Search Results. The type, nature, quality, and number of links to Content is also sometimes used to determine the ranking of Organic Search Results. Importantly, many website developers and SEOs have devised ways to impact and alter the Organic Search Results to their benefit to gain valuable Internet traffic. Many of these approaches may not provide end users with the more relevant Organic Search Results that would be derived without SEOs "gaming" the system to increase the inclusion and ranking of Content in Organic Search Results.

SEOs attempt to improve rankings for the Content by ensuring that appropriate Search Terms are embedded in the Content that are most relevant to the Search Terms used by the Search Algorithms. This is accomplished by including various terms in the Content or related web pages, but it is also accomplished by modifying or manipulating Search Terms in title pages, meta tags, headings, and even modifying the architecture, internal and external link structure, and navigation of a web site and Content.

Optimizing the exposure of websites and other Content on Search Results pages and other Content displaying Paid Search Results has also created a new and significant industry referred to as Search Engine Marketing ("SEM") and numerous SEM companies ("SEMs") specialize in selling products and services designed to enhance the inclusion and ranking of websites and other content in Paid Search Results.

SEM has evolved into a very large industry, and while Internet Search Companies work to improve Organic Search Results, well-known companies make virtually all of their revenue selling Paid Advertising designed to enhance the Advertiser's position in Paid Search Results. Unfortunately, the ecosystem surrounding Paid Search Results is focused primarily on ranking advertisers who Bid on certain search terms or keywords, typically based solely on the amount of the Bid that the advertiser is willing pay for a click-through to the website or other action, e.g. a telephone call. It has even encouraged the development of specialized web site operators known as "Arbitrageurs." Arbitrageurs are Website Operators who Bid on keywords in an effort to get traffic to their websites, so that traffic will click on Paid Search Results displayed on the Arbitrageur's website, resulting in the Website Operator earning slightly more from the click-through than the Website Operator paid to get the traffic to its sites. The Paid Advertising model has become pervasive in today's Internet Search world, and with the proliferation of Arbitrageurs, SEMs, and innovative website developers, this Paid Advertising model in many cases may result in substantially distorted and biased Paid Search Results that are not optimal for Internet Users.

As described above, it has become increasingly difficult for Internet Users to find relevant and relevantly filtered Organic Search Results and Paid Search Results. Similarly, Paid Search Results have become increasingly biased due to these problems and the added issues and distortions that may be caused by purely, dominantly, or even partially economically driven Paid Advertising system. Thus, the current Internet Search ecosystem has become less effective for both Internet Users and Advertisers. Unfortunately, because of the nature of Paid Search and the phenomenal economic success of this system, Advertisers are essentially forced to "Pay to Play" in the Paid Advertising system in order to gain the much desired access to Internet Users through Search Results.

The tremendous increase in the number of websites and detailed information available on the Internet has caused the sheer volume of information to become so tremendous that it is becoming more and more difficult for users to find what they want through Internet Search Requests. It is not uncommon to get thousands or even millions of responses to a common search term. For example, Exhibit A in provisional application Ser. No. 60/744,804 (also included as FIG. 7 herein) shows a response from Mar. 13, 2006 for a Search Request including only the Search Term "Ford" on Google included one hundred forty two million (142,000,000) responses, as highlighted at "A." If one were to spend ten seconds reviewing each response for eight hours every day nonstop, it would still take years to review each of the Search Results.

The current Internet Search paradigm for Organic Search Results may be described as "unstructured search and unstructured results," and users are becoming more and more frustrated in their efforts to quickly request and receive precisely what they are looking for in Internet Searches. In addition, Internet Companies may be disincented to do anything to alter the Paid Advertising system because of the tremendously negative impact it would have on their business models, revenues, and their resulting market capitalizations if they fail to meet their growth expectations.

Clever Internet Website Operators, including Arbitrageurs and others whose primary business objective may be exploiting the Internet Search ecosystem for economic gain rather than developing or providing meaningful content to Internet Users, have developed various ways to increase their chances of being displayed and elevated in Search Results.

While most Search Companies have a process for determining whether or not a particular Advertiser should be allowed to Bid and purchase particular Search Terms, these systems are essentially limited to determining whether the Advertiser has some connection, however slight, to the keyword or Search Terms for which they are bidding. Thus, the Paid Advertising system is fairly open and numerous bidders can 'game the system" in order to Bid on Search Terms and have their Content appear in Paid Search Results. For example, Exhibit A in provisional application Ser. No. 60/744,804 (also included as FIG. 7 herein) shows the inclusion of a Paid Advertisement, highlighted at "B," found under the phrase "Sponsored Links" on the Search Results page for a plaintiff's lawyer seeking plaintiffs to sue Ford in the Paid Search Results. It is unlikely that Ford authorized the Advertiser to use the term "Ford" in its advertising, and under the Paid Advertising system, Ford Motor Company, together with all of its Authorized Brand Licensees, may be forced to Bid against this plaintiff's law firm for placement in Paid Search Results. If the Internet User is seeking to learn more about Ford automobiles or to find the closest Ford Dealer, it is unlikely that this Internet User wants to see an ad or "Sponsored Link" for such a plaintiff's lawyer, and the presence of this "link" may negatively impact the Internet User's impression of Ford.

Oftentimes Internet Users are frustrated when looking for specific brands because so many different Paid Search Results are displayed. If the Internet User searches for the Search Term "Panasonic," they may or may not want to see "Sony" products, since there is probably a reason they used the Search Term "Panasonic" in their Search Request instead of "Sony" or a generic product description. Similarly, if the Internet User searches for "Panasonic DVRs," again they may or may not want to see "Sony DVRs." They may already own a Panasonic DVR and merely be looking for customer support, a copy of the owners' manual, a service or parts center, online troubleshooting or user groups, and the like. It is not fair to assume that an Internet User is looking to buy a DVR of any brand, much less a competing brand, yet given the current Internet Search ecosystem it is likely that the Internet User will be shown Paid Search Results and links to eCommerce sites trying to sell him a DVR of any type or Brand, often those of the competitor of the Brand that was included in the User Search Request. Thus, the paradox of the current search ecosystem is that an owner, licensee or other holder of a brand may spend millions over several years to build a brand, develop awareness and value associated with their brand, only to have a competitor out bid the brandholder and therefore rank its Content higher in the Paid Search Results.

Another example of the inefficient Search Results related to a Search Request is set forth on Exhibit C of provisional Ser. No. 60/744,804, (also included as FIG. 8 herein) which shows the first page of results for a search for "Marriott's Shadow Ridge" on Google on Apr. 9, 2006. Marriott's Shadow Ridge is a major residential condominium resort complex in Palm Desert, Calif. Note that none of the "Sponsored Links" in the right column or the first few Search Results in the left column are websites operated by Marriott's Shadow Ridge complex or any related party. Instead, all of the Sponsored Links are paid for by various travel related sites that have links to this specific resort and/or promote this specific resort to Internet Users. In many cases, these sites are Arbitrageurs that are attempting to intercept Internet Users looking for Marriott's Shadow Ridge in an effort to pull the Internet User to the Arbitrageur's website and make money on the Internet Users clicking on Paid Search Results on the Arbitrageur's site. In fact, the Arbitrageur may simply be trying to get the Internet User to the Arbitrageur's site so that the Internet User will then click on a Content link to the Marriott's Shadow Ridge website, thereby allowing the Arbitrageur to monetize the Internet User as it passes through the Arbitrageur's websites. In some cases, Internet Users pass through numerous Arbitrageur's websites as they relentlessly search for what they wanted in the first place—the website for Marriott's Shadow Ridge. Alternatively, these Website Operators may be attempting to get the Internet User to visit their website to book a reservation at Marriott's Shadow Ridge and/or another property represented by the Website Operator, or they may just be enterprising lodging Website Operators looking to capture lodging traffic.

The Paid Search Results and Organic Search Results show listings and or sponsored listings from such companies as Vacationclub.com, SellmyTimeshare.com, yahoo.com, ebay.com, hotels.com, and tripadvisor.com. The inefficiency of this system is readily apparent from the above results, and this inefficiency may be directly related to additional Paid Search costs for the Marriott's Shadow Ridge Resort because they have to Bid against others who are Bidding on Marriott's Shadow Ridge Brand. While the inefficiencies of this type of system is clear, these very inefficiencies drive substantial Paid Search revenues to major Search Companies as those companies typically earn and retain a substantial portion of the Paid Search revenues on each and every paid click that an Internet User makes in their journey to the site they were looking for all along. Thus, Search Companies may make two to five (2-5) times as much money for each Internet Users using their system than they would if the Internet User were correctly directed immediately to the Content they were initially seeking. Given the resources and success of the Search Companies, it is likely that they have the capability to build a better system, one that may more easily and efficiently direct Internet Users directly to Marriott's Shadow Ridge resort, and there are some efforts to do so, but it would appear that these efforts are ineffective and are likely to fall short.

Accordingly, systems and methods that may address the difficulties and/or flaws in these types of results and/or that may provide new and innovative ways to improve Internet Search Results would be useful.

SUMMARY

The present invention is directed to systems and methods for displaying Content through media of all types, including Internet Searches, e.g., as a result of conducting searches over a network, such as the Internet, and/or on computing devices, such as vehicle navigation systems, PCs, and Non-PC Devices, based at least in part upon Search Terms and/or other factors, e.g., that include Brands and/or Branded Products, such as trademarks, trade names, and the like pursuant to a brand search ecosystem. In an exemplary embodiment, a "Brand Search Ecosystem" or "BSE" may be provided that allows Brandholders at least some direct and/or indirect measures of input, participation, and/or control (as further defined below, collectively "Input" or "BSE Input") in the delivery of Search Results. The systems and methods described herein may streamline, improve, and/or optimize Search Results and the Internet User experience, minimize dilution that may be negatively impacting Brandholders in the current Internet Search ecosystems and paradigms, and/or allow Brandholders to more effectively retain and grow the tangible and intangible economic benefits associated with their Brands. The systems and methods may provide for creating databases, search paradigms, and/or incentives among participants in the BSE to support automated Brand-based, pay-per-performance search and advertising systems whether or not related directly to Internet Searches.

Optionally, the Brand Search Ecosystem may include a variety of features and/or functionality, including various incentives ("BSE Incentives") for the benefit of Brandholders, persons bidding on Search Terms that include Brands ("Brandbidders") in order to have their Content included in Paid Search Results, Internet Users, and other participants in the BSE (collectively, "BSE Participants"). BSE Incentives may include non-economic benefits and incentives ("BSE Non-Economic Incentives") and economic incentives (e.g., credits, allocations, expense reimbursements, etc.) ("BSE Economic Incentives"), including Economic Incentive Payments ("EIPs"). EIPs include payments or allocations of monetary or monetarily definable consideration from a BSE Participant to another BSE Participant. For example, a BSE Search Company may make an EIP to a Brandholder or a Brandbidder, a Brandholder may make an EIP payment to a Brandbidder or Internet User, and the like.

In accordance with one embodiment, a system is provided for searching via a network based upon brands and/or providing economic incentive payments to one or more participants in the system. The system includes a brand name database including a plurality of brands and brandholders and brandbidders associated with respective brands. One or more search engines may communicate with the brand name database, e.g., via a network, for accessing the brand name database to identify brandholders and brandbidders associated with brands included in search inquiries received by the search engine via the network. The search engine may also receive search requests from users, e.g., including brands, qualifiers, and/or other terms, and access the brand name database to provide search results to the users. A clearing house may also be provided for processing economic incentive payments to at least one of brandholders and brandbidders associated with brands in the brand name database.

In accordance with another embodiment, a local computing device is provided for a system including one or more remote computing devices, a brand name database including a plurality of brands and brandbidder information associated with respective brands, a search engine, and a clearing house interconnected by a network. The local computing device may include an interface communicating with the brand name database; a communication interface for communicating with the one or more remote computing devices via the network for receiving search requests including brands from users of the one or more remote computing devices; and a processor for extracting brands from search requests received from the users of the one or more remote computing devices, the processor communicating with the brand name database and receiving brandbidder information associated with the respective brands. The communication interface may also provide search results including the brandbidder information to the users of the one or more remote computing devices. In addition or alternatively, the processor or other component of the system may determine one or more economic incentive payments to the brandholders and/or brandbidders based upon the brands included in the search requests.

In accordance with still another embodiment, a system is provided for conducting online searches using a brand that includes a brand name database including a plurality of brands associated with respective brandholder and brandbidder information associated with respective brands, and a database manager including business rules for associating brandholders with respective brands and brandbidders with respective brands based upon the business rules. A search engine may communicate with the brand name database for receiving and responding to brand requests via a network. In one embodiment, the database manager may be configured for receiving a brandholder request from a brandholder to be associated with a brand in the brand name database, applying the business rules to the brandholder request to determine a level of association of the brandholder with the brand, and allowing the brandholder to provide input into associating brandbidder information with the brand.

In accordance with another embodiment, a method is provided for establishing a brand name database including a plurality of brands associated with respective brandholders and brandbidder information associated with respective brands, and a search engine communicating with the brand name database for receiving and responding to brand search requests via a network. A brandholder request may be received from a brandholder to be associated with a brand in the brand name database, and business rules of the brand name database may be applied to the brandholder request to determine a level of association of the brandholder with the brand, and the brandholder may be allowed to provide input into associating brandbidder information with the brand.

In accordance with still another embodiment, a method is provided for establishing a brand name database including a plurality of brands associated with respective brandholders and brandbidder information associated with respective brands, and a search engine communicating with the brand name database for receiving and responding to brand search requests via a network. A brandbidder request may be received to have brandbidder information for the brandbidder associated with a brand in the brand name database, and business rules of the brand name database may be applied to the brandbidder request to determine a level of association of the brandbidder. Optionally, an economic incentive payment may be provided to the brandholder and/or the brandbidder as a result of revenues derived from one or more search terms including the brand associated with the brandbidder when a brand search request is received by the search engine.

In accordance with yet another embodiment, a method is provided for conducting online searches using a brand name database including a plurality of brands and brandbidder information associated with respective brands, and a search engine communicating with the brand name database via a network. A search request may be received via the network from a user that includes one or more brands, qualifiers, and/or other terms. The brand name database may be searched for the brand and brandbidder information associated with the brand, and search results may be sent to the user via the network. The search results may include information, such as brandbidder information associated with one or more brandbidders associated with the brand. Optionally, an economic incentive payment may be provided to at least one of the brandholder associated with the brand and at least one of the one or more brandbidders associated with the brand based upon the search inquiry.

In accordance with still another embodiment, a method is provided for conducting online searches using a brand name database including a plurality of brands and brandbidder information associated with respective brands, and a search engine communicating with the brand name database via a network. A search inquiry may be received via the network from a user that includes a brand and at least one qualifier. The brand name database may be searched for the brand and information associated with the brand and the qualifier, and search results may be sent to the user via the network. The search results may include information associated with the brand and the qualifier, such as brandbidder information related to brandbidders who qualify to be included in the search results.

In accordance with yet another embodiment, a method is provided for providing Internet search results from an Internet search engine accessing a brand name database including business rules based at least in part on input from brandholders and information associated with respective brands. A search request may be received from an Internet user, e.g., including one or more brands, qualifiers, and/or other terms. The search request may be associated with the brand name database including the information, the business rules may be applied to the search request to determine search results from the information, and the search results may be provided to the Internet user.

In accordance with still another embodiment, a method is provided for compensating brandholders who provide input related to delivering Internet search results from an Internet search engine accessing a paid or bidded brand name database by providing economic incentive payments to the brandholders based on revenues derived from the brand name database based on the brandholders' brands. A search request may be received from an Internet user that includes a brand, the search request may be associated with the brand name database, the business rules may be applied to determine search results for the search request, and the search results may be provided to the Internet user. Optionally, the search results may be tracked and/or accounted for to apply a portion of revenues derived from the search request to an account of a brandholder associated with the brand as an economic incentive payment. In addition or alternatively, the search results may be tracked and/or accounted for an amount paid by the brandbidder to be associated with the search results and/or reported the amount to the brandholder. For example, the brandholder may provide an economic incentive payment to the brandbidder based upon the search results and/or subsequent action by the user.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE EXEMPLARY EMBODIMENTS

Figure 1:
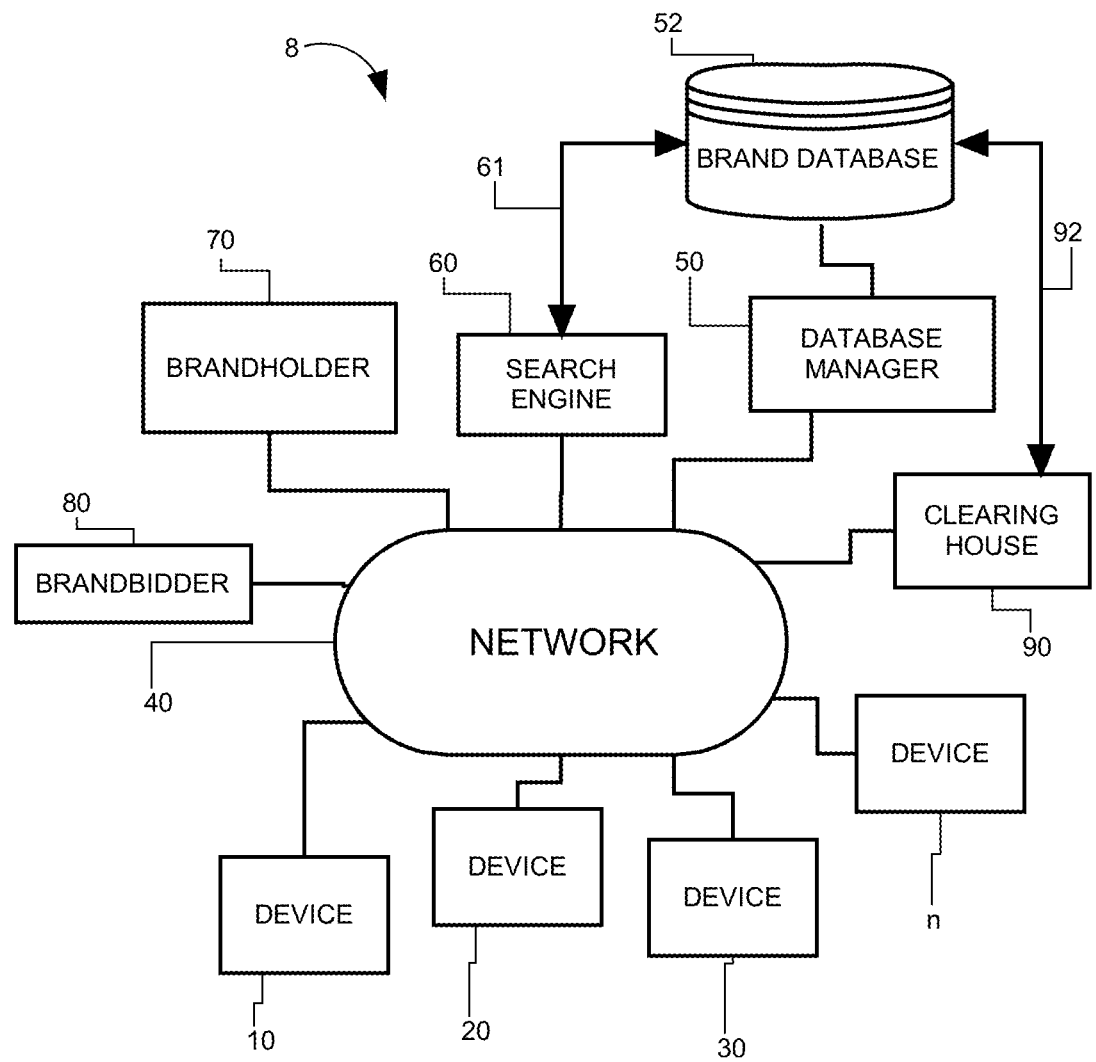
FIG. 1 is a schematic drawing showing a network architecture providing an exemplary embodiment of a brand search ecosystem.

A number of factors described above surrounding Search Results and the current Internet Search environment and ecosystem have combined to require Brandholders to spend substantial resources to build and attain the benefits of their Brands. These factors also have caused many Brandholders substantial economic and other harm, both in the short and long run, and both objectively measurable (e.g., having to pay a Search Engine to be shown in Paid Search Results even when the sole search term is the Brand itself) and measurable and subjective and difficult to measure (e.g. the loss of sale, the short and long-term dilution of the value of the brand resulting from unauthorized persons, including competitors, bidding on the Brand terms and thereby obtaining access to person looking for the Brand or Branded Products).

The newness and significance of the existing Internet Search ecosystem, the openness, real-time, and micro-payment nature of payments made for Paid Results, and the Pay to Play nature of Paid Results ranking, when combined with the significant legitimate and illegitimate economic potential and incentives available to virtually any business, including Arbitrageurs, all combine to harm Brandholders and the value of their Brands.

No one has devised an Internet Search ecosystem that effectively protects, rewards, empowers, and/or incentivizes Brandholders to protect their Brands when Internet Users conduct Search Requests including Search Terms that include their Brands. For convenience, such Searches for Brands are referred to herein as a "Branded Search" or "Branded Searches." Search Results related to Branded Searches are referred to as "Branded Search Results," and Search Terms including Brands are referred to as "Branded Search Terms." In many cases, Brandholders are effectively required to spend substantial sums with Search Companies to buy Brand Search Terms that are identical or similar to their own Brands just to be seen when Internet Users are using their Brands as Search Terms. Thus, Brandholders are actually incurring substantial expenses to obtain the full value of their Brand and Branded Products by having to pay Search Companies just to be seen first or adequately when Internet users are conducting a Branded Search.

Search Companies have made millions from Brandholders paying to be included in Paid Results when Internet Users conduct Branded Searches using their Brands. While many Brandholders are voluntarily participating in this "Pay to Play" Paid Advertising system and are therefore paying for their Brand Search Terms, they really have no other choice given the current Internet Search ecosystem if they want to protect their Brand and want their Branded Products to be seen if Internet Users conduct Branded Searches. Even more frustrating for Brandholders, if someone else pays more for the Brandholder's Branded Search Terms in this Pay to Play Paid Advertising system, they get more benefit from the Brandholder's Brand than the Brandholder itself, possibly wrongfully intercepting the Internet User, usurping value from the Brandholder's Brand, and possibly diluting the value of the Brand both inside and outside the Internet.

The issues, problems, and disadvantages of the current Internet Search ecosystem are not new and have plagued Brandholders for the last several years. Many companies have gone so far as to file litigation against the major Search Companies to address many of these issues. Collectively, Brandholders have paid millions to Search Companies, which has resulted in billions in market capitalization for these Search Companies, just so that the Brandholders Brands may be seen when Internet Users are conducting Branded Searches. One can easily conclude that these Search Companies and their shareholders have made millions at the cost and expense of legitimate Brandholders who have been effectively forced to spend millions participating in this Pay to Play Paid Advertising system just to have their own Branded Products displayed in Branded Search Results, not to mention other efforts to protect a Brand from infringement and dilution.

Brandholders spend millions creating, building, and protecting their Brands over many years and even decades. Brandholders spend enormous sums of money, time, and effort on product development, marketing, advertising, customer service, and legal costs to build, protect, and then enjoy the economic benefits of their Brands. A strong argument can be made that the entire effort of many businesses and even other organizations can be closely associated with increasing the value of their Branded Products and Brands, which can then be monetized in both the short run and long-run through their businesses or other activities (e.g. philanthropic in the case of a charity).

There are numerous and pervasive problems in a Search Results ecosystem that requires legitimate Brandholders to pay a bounty to Search Companies just to receive the full value of their own Brand identity through being included prominently in Branded Search Results when Internet Users are conducting Branded Searches.

In addition to the problems associated with legitimate Brandholders having to pay Search Companies to have their websites and content displayed in Paid Search Results, there are other problems for legitimate Brandholders in the current Search Results ecosystem. The first of these is the fact that others (e.g., Arbitrageurs, cyber-squatters, and even competitors) can Bid on a Brandholder's specific Brand and be seen when an Internet User conducts a Branded Search. And while Search Companies purport to make some efforts to protect against this illegitimate abuse of the Search ecosystem, such efforts are not particularly effective. As described above, in the short run, Search Companies have a tremendous disincentive to effectively thwart illegitimate bidding on Brands under the Paid Advertising system. Not only would they presumably lose illegitimate Bidders, but the presence of illegitimate Bidders may actually cause or require legitimate Bidders to pay more in the Paid Advertising system to ensure that their Content is associated with their Brand. If there were only one legitimate Bidder in the Paid Advertising system and if all illegitimate Bidders were eliminated, then, in theory, at least the legitimate Bidder would no longer be required to Bid to be seen. Interestingly, this is not necessarily a wrong result from an equitable or fundamental fairness point of view when one recognizes the ownership rights of Brandholders in their Brands. However, one can easily see the ramifications to the Search Companies if the Paid Advertising system were altered to the point that there were no illegitimate Bidders participating in the Paid Advertising system. Thus, asking the Search Companies to effectively police illegitimate Bidders and/or provide legitimate Brandholders more control over the use of their Brand may be against the economic interests of the Search Companies in the current Paid Search environment.

The negative impact of the Paid Advertising system is exacerbated by the multiplier effect of the Paid Search Results system caused by Arbitrageurs and others who are not providing any meaningful content in their Search Results, but rather are attempting to get Internet Users to their sites so that they will ultimately click on Paid Results on their site, thereby driving revenues to the Web site Operator. Thus, Paid Search Results often contain links that take Internet Users to sites that are designed primarily to get users to conduct other Paid Search Requests or click on links provided in Paid Search Results. In some cases, it may take several Paid Search Results links to reach the underlying original Content the Internet Users are seeking to ensure that their Content is associated with their Brand.

Search Companies typically make money on all of these multiple clicks from the same Internet User who may click through several Internet sites (Arbitrageurs or not) before they find their way, if at all, to the original Content they were seeking. This multiplier effect brings even more Bidders into the Bidding, thereby driving prices up further, and thereby causing Brandholders to pay even more for their Branded Search Terms. Of course, again the Search Companies have little incentive to solve this problem because they are beneficiaries of this inefficiency and monetary infringement of the Brandholder's Brands as their total revenues and profits are driven up further and further as they receive multiple and larger payments from advertisers in a Paid Search Results ecosystem.

It is well known and recognized in most legal systems throughout the world that Brandholders own their Brands and have a right to bar others from wrongfully using their Brands. In fact, in the United States the failure to adequately affirmatively protect a trademark may result in loss of the Brandholders' rights to their trademarks. Before the development of the Internet, Brandholders collectively spent millions every year to protect their Brands against infringers. The creation of the Internet and Internet Searches, and Paid Search Results in particular, created entirely new economic incentives and frontiers for infringers to wrongfully exploit Brandholders' Brands to the substantial detriment of Brandholders. Brandholders have been unable to keep up, and the current Internet Search ecosystem is arguably very negatively impacting a significant number of Brands.

Brandholders currently have no control over who Bids on their Brand and how the Search Companies deliver Search Results for Branded Search Terms. Legal and other rights and remedies have not proven effective and may, in fact, ultimately be ineffective to protect the rights and value of legitimate Brandholders in a Paid Search system. The various problems associated with Branded Search Terms range from relatively minor and innocent errors to intentional and overt abuses of the Paid Advertising model in efforts to wrongfully intercept Internet Users who are seeking information about, or the goods and services of Brandholders. These abuses may be initiated by a number of people, including those who do not have an wrongful motive but are nevertheless distorting Paid Search Results at the cost of the Brandholder, and those who are intentionally abusing the Pay-to-Play Paid Advertising system and who have essentially found deficiencies and inefficiencies in the Paid Search Results and are exploiting them for their own economic gain at the cost of the Brandholders. Despite the cost and harm that Brandholders are enduring under the current Paid Search Results ecosystem, to date, there has been no effective alternative search ecosystem that attempt to solve or mitigate these issues.

In one embodiment, a Brand Search Ecosystem, or BSE may provide Brandholders with the ability to influence Organic Search Results and/or Paid Search Results by establishing new systems, controls, rules, economic incentives, and/or a clearinghouse of information, and/or authorizations. The BSE may be designed to recognize legitimate Brandholders' rights in their Brands, provide economic resources to Brandholders to participate in and help administer the BSE, and/or provide Brandholders new tools and techniques for building the value of their Brands and Branded Products, minimizing dilution and otherwise protecting and obtaining the value of their Brand.

A system that helps Internet Users find desired Brands and/or Branded Products when they are looking specifically for those Brands and/or Branded Products may help Internet Users more quickly obtain more relevant Search Results related to those Brands and/or Branded Products. Such a system may also help them find Search Results when they are NOT looking for Brands and/or Branded Products by NOT designating a Search as one associated with the Brand and/or Branded Products and thereby avoiding all of the Search Results associated with the Brands and/or Branded Products.

Therefore, the BSE may be designed and/or practiced in ways that benefit both Brandholders and Internet Users, and/or may be empowered with tools that can be used to fairly and appropriately balance the respective interests and legitimate rights of Internet Users and Brandholders. It may do so in ways that provide that the operators of the BSE are more neutral and have economic interests aligned with this balance and not almost entirely with expanding and growing Paid Search Results.

Enlisting the support of legitimate Brandholders in this effort may also result in better information about Branded Products being found more easily and/or quickly. The Brandholders' input may help its customers and/or potential customers quickly and easily find the desired information, products, and/or services they are seeking. This may provide a significant benefit to Internet Users who today are often frustrated in their efforts to quickly find legitimate information about Branded Products. Importantly, because the major Brands also generate more products and services and therefore presumably more Internet Searches, the BSE may impact a large number of Internet Searches.

Historically and outside of the Internet, actions and activities associated with protecting Brands may be controlled exclusively by the Brandholders, although license agreements may contain a variety of terms that control and/or affect the licensees' rights to use or take actions to protect or use the Brands. The BSE System may provide tools, interfaces, trafficking, and/or reporting tools to enable these types of marketing agreements and incentives to be applied, managed, and accounted for through the Internet and the Internet Search ecosystem.

Turning now to the drawings, FIG. 1 shows an exemplary embodiment of a system 8 for providing a Brand Search Ecosystem or "BSE," e.g., for establishing, searching, and/or otherwise using a brand name database 52. The system 8 and related methods may be used in a Search environment, e.g., where Brandholders have Input into and/or other partial control of the algorithms and business rules used to acquire information, prioritize, filter, display, and/or otherwise determine the inclusion and priority of BSE Search Results, e.g., incentivizing, authorizing, providing information, reviewing, or otherwise impacting the way that Bidders appear in Search Results (collectively, "BSE Algorithms"). The systems and methods described herein may also be applicable in organic search and/or other environments. For example, Content may be displayed in accordance with the systems and methods described herein in the absence of Search Results or Advertising across any form of Media, Internet or otherwise.

As shown in FIG. 1, the system 8 includes various devices connected to a network 40, such as user devices 10, 20, 30, n, a database manager 50, and a search engine 60. In addition or alternatively, the system 8 may also include one or more brandholders 70, bidders 80, and/or clearing houses 90 (one each shown for simplicity) connected to the network 40 for interacting, tracking, recording, accounting, or otherwise communicating with the database manager 50 and/or search engine 60.

In one embodiment, the network 40 may be a wide area network ("WAN"), a local area network ("LAN"), an intranet, a wireless network, a short messaging service ("SMS"), or a telephony network. For example, the network 40 may incorporate several different types of networks including a WAN, a LAN, and/or a wireless network; one such network including multiple different types of networks is the Internet.

Each of the user devices 10-n is a computing device, such as a desktop computer, a laptop computer, a mobile or cellular telephone, a personal digital assistant (e.g., a Palm Pilot device, Blackberry device, and the like), an interactive television, a vehicle navigation system, a kiosk, a lobby or elevator monitor, or other electronic device, capable of communicating via the network 40. Generally, the user devices 10-n may include one or more processors, memory and/or storage devices, communication interfaces, and/or user interfaces, e.g., a display, keyboard, mouse, and the like (all not shown). Users of the user devices 10-n may interact with the search engine 60, e.g., submitting Search Requests including one or more Brands, categories, products and/or other Search Terms, as described further below. Alternatively, in a non-search environment, the user devices 10-n may be recipients of Content via the network, e.g., based upon requests and/or other criteria.

The database manager 50 may include one or more computer systems, e.g., servers, communicating with the brand name database 52, e.g., including one or more processors, memory and/or storage devices, and communication interfaces for communicating via the network 40, e.g., with the search engine 60, brandholder(s) 70, bidder(s) 80, and/or clearing house(s) 90. In addition or alternatively, the database manager 50 may communicate directly with the search engine 60, as represented by line 62, and/or may be operated directly by or communicate directly with the clearing house(s) 90, in addition to or instead of via the network 40, as represented by line 92. The database manager 50 may include one or more hardware-based components and/or software-based modules for performing the various functions related to the brand name database 52, as described elsewhere herein. Although only one database manager 50 and search engine 60 are shown, it will be appreciated that multiple database managers and/or Search Engines (not shown) may be provided. For example, multiple Search Companies may operate independent Search Engines, similar to search engine 60, that may have authority to access and/or modify data in the brand name database 52 establish or influence rules of the database manager 50 and/or clearing house 90, depending upon the rules of the system 8, as described elsewhere herein.

Figure 2:
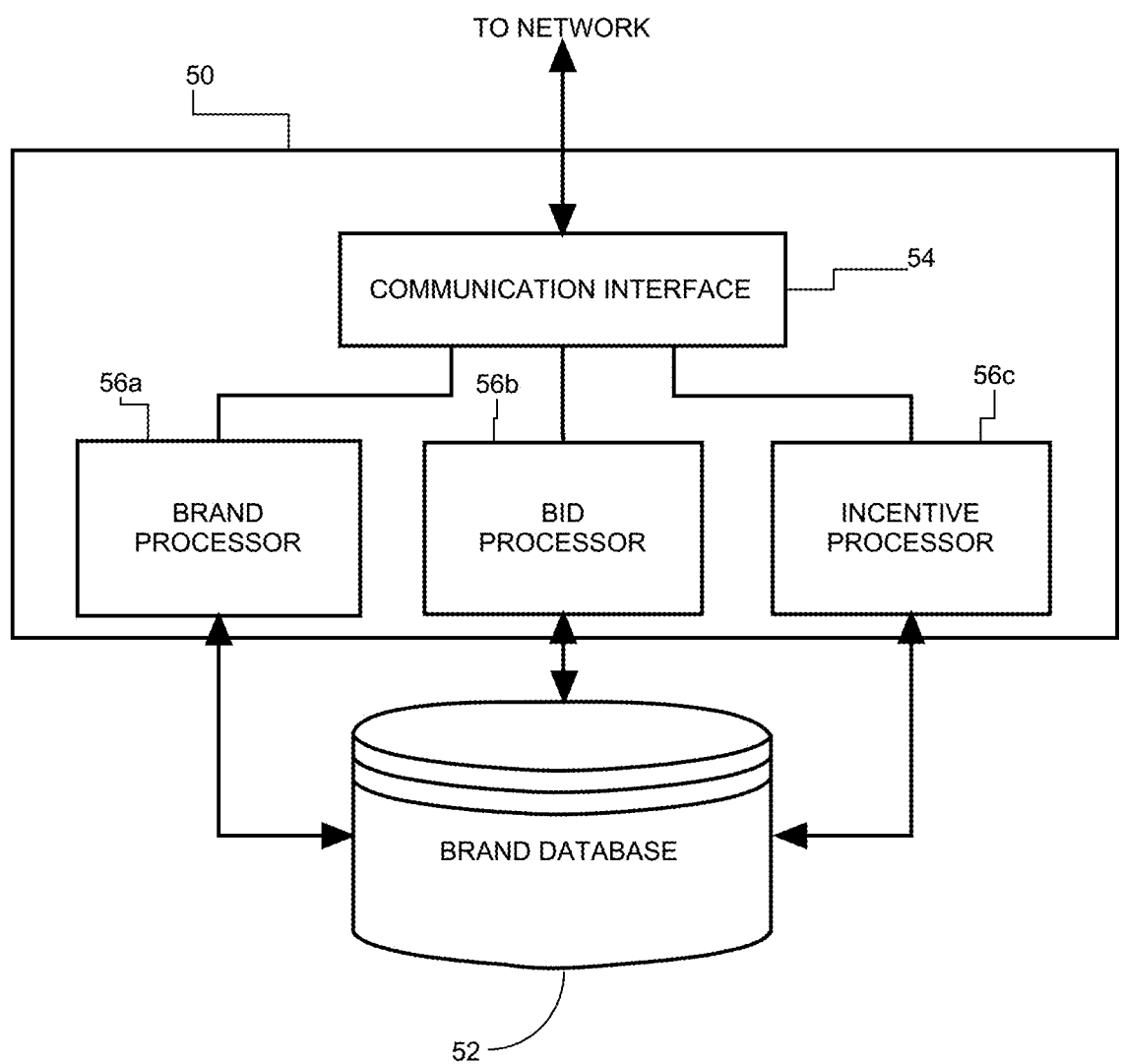
FIG. 2 is a schematic drawing showing an exemplary embodiment of a database manager that may be included in the brand search ecosystem of FIG. 1.

Turning to FIG. 2, an exemplary embodiment of a database manager 50 is shown that includes a communication interface 54, and one or more modules and/or processors 56, e.g., a brand processor 56a, bid processor 56b, and incentive processor 56c (which may include hardware and/or software components), that communicate with the brand name database 52. The communication interface 54 may allow data to be transferred between the processors 56 and/or brand name database 52 and external devices, networks, and the like. Examples of devices that may be included in the communication interface 54 are one or more modems, network interfaces (for example, Ethernet cards), communications ports, PCMCIA slots and/or cards, wireless interfaces, such as infrared and/or radio frequency (RF) interfaces (such as those using the Bluetooth standard), and the like. The communication interface 54 may manage incoming communications to determine the appropriate function to be performed, and the modules and/or processors 56 may communicate as appropriate with the brand name database 52 based upon the communications and/or instruct the communication interface 54 to send information to other devices, as described further elsewhere herein.

The brand name database 52 is a computer system capable of storing and/or serving up information, such as Brands, Brandholders associated with respective Brands, Bidders associated with respective Brands, and additional optional information related to the Brands, Brandholders, and/or Bidders, or business rules and/or other information related to Search Algorithms associated with delivering Search Results for Search Requests incorporating Brands. In addition or alternatively, the brand name database 52 may store Qualifiers or other designators that may be associated with one or more of the Brands, Brandholders, and/or Bidders. As used herein, "Brand" includes any term that may be used by the brand name database 52 to uniquely identify a product, good, service, or function, such as a trademark; a service mark; a trade name; an individual's name, e.g., of a celebrity; an organization name; a geographic name, such as a state, city, or community; a fictitious name; a product or feature name or pseudo-name; a moniker; and the like (whether registered as trademarks, service marks, or otherwise legally protected or not). Also as used herein, "Qualifier" includes any term that may be used to provide a trigger, categorize, and/or prioritize Search Requests and/or Search Results, such as categories of products (e.g., the International Classification systems used for trademarks), specific product names or types, geographic descriptors, temporal descriptors, and the like. Brandholder may also include persons who have purchased from Search Engines the exclusive or non-exclusive right to have certain terms associated with their products and/or services in Search Results even if those terms are not technically "owned" by the Brandholder.

Returning to FIG. 1, the brandholder(s) 70 and/or bidder(s) 80 may include one or more computing devices, e.g., similar to the user devices 10-n, and/or servers or other computer systems operated or maintained by Brandholders and/or Bidders. These may be specialized systems or devices used exclusively to interact with the database manager 50 and/or clearing house(s) 90, or may be generalized systems or devices used by the Brandholders and/or Bidders.

As used herein, "Brandholder" includes any source of products, e.g., goods and services, that may be identified or otherwise associated with such products and one or more Brands, i.e., having legal, contractual, or other rights in the Brand(s), such as a top-level manufacturer, seller, reseller, and promoter of products, and may include entities, such as a company, an association, a trademark owner, a service mark owner, an individual, such as a celebrity, advertisers, and the like. Brandholder may also include the persons who have purchased from Search Engines the exclusive or non-exclusive right to have certain terms associated with their products and services in Search Result even if those terms are not technically "owned" by the Brandholder. As used herein, "Bidder" may include any entity that sells, resells, advertises, or promotes products associated with one or more Brands, other than the Brandholder. As used herein, "Branded Products" include anything legitimately related to a Brand, including web sites, product information, marketing materials, store and other locations, parts, and/or goods and services associated with the Brand.

Generally, a Brandholder has legal and/or contractual rights or other authority over its Brands that may be identified and/or recognized in an objective manner, e.g., as a trademark owner, creator, or purchaser. A bidder, however, does not have such rights or other authority over the applicable Brands, or, if a Bidder has any such rights, they are subordinate to and/or derived from the Brandholder. For example, in a Paid Search Results environment, a Bidder may bid to have its information, e.g., address, URL, or other contact information, product offerings, and the like, associated with Search Results based upon a Search Request including one or more Brands upon which the Bidder has bid, as described further elsewhere herein. Alternatively, instead of Bidders, Content providers or other "Vendors" may replace Bidders as used herein, e.g., any entity that sells, resells, advertises, or promotes products associated with one or more Brands, other than the Brandholder, but in a non-bidding environment. As described elsewhere herein, the database manager 50 and/or the clearing house 90 may establish business rules to identify and/or distinguish Brandholders and Bidders, and/or to establish their rights and/or obligations within the system 8.

With continued reference to FIG. 1, the clearing house 90 may include one or more institutions and/or schemes established for tracking, reporting, accounting for, and/or settling incentive and/or other payments via the network. For example, in one embodiment, the clearing house 90 may simply include one or more banks or other financial institutions that may maintain accounts for one or more of the Brandholders 70, Bidders 80, users of user devices 10-2, Search Companies operating the search engine 60, and the like. For example, the clearing house 90 may manage any credits, charges, payments, and/or other incentives provided to and/or from any of the participants in the system 8, e.g., providing periodic net credits, charges, payments, and/or other incentives to the participants, as described further elsewhere herein.

In addition or alternatively, the clearing house 90 may oversee at least some of the functions of the database manager 50, e.g., to establish and/or effectuate one or more business rules and/or guidelines, arbitration rules, incentive programs, search engine protocols, and the like, also as described further elsewhere herein. In this alternative, the clearing house 90 may be associated with a consortium including Brandholders and/or other members or affiliates, who may have input into the business rules and/or functions related to the system 8.

Figure 3:
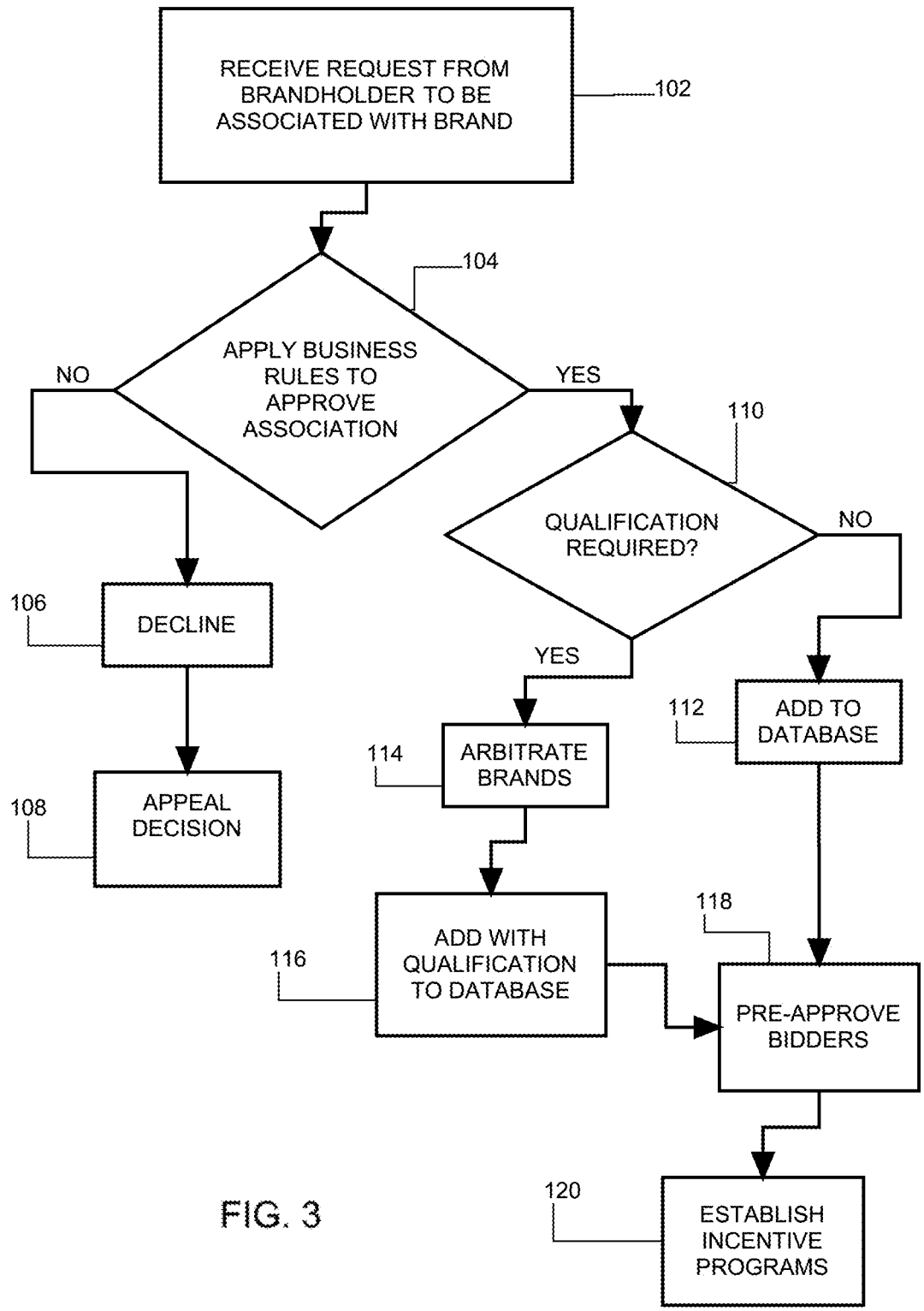
FIG. 3 is a flowchart showing an exemplary embodiment of a method for processing requests from Brandholders to have their Brands included in a brand name database and to establish and/or track incentive programs.
Figure 4:
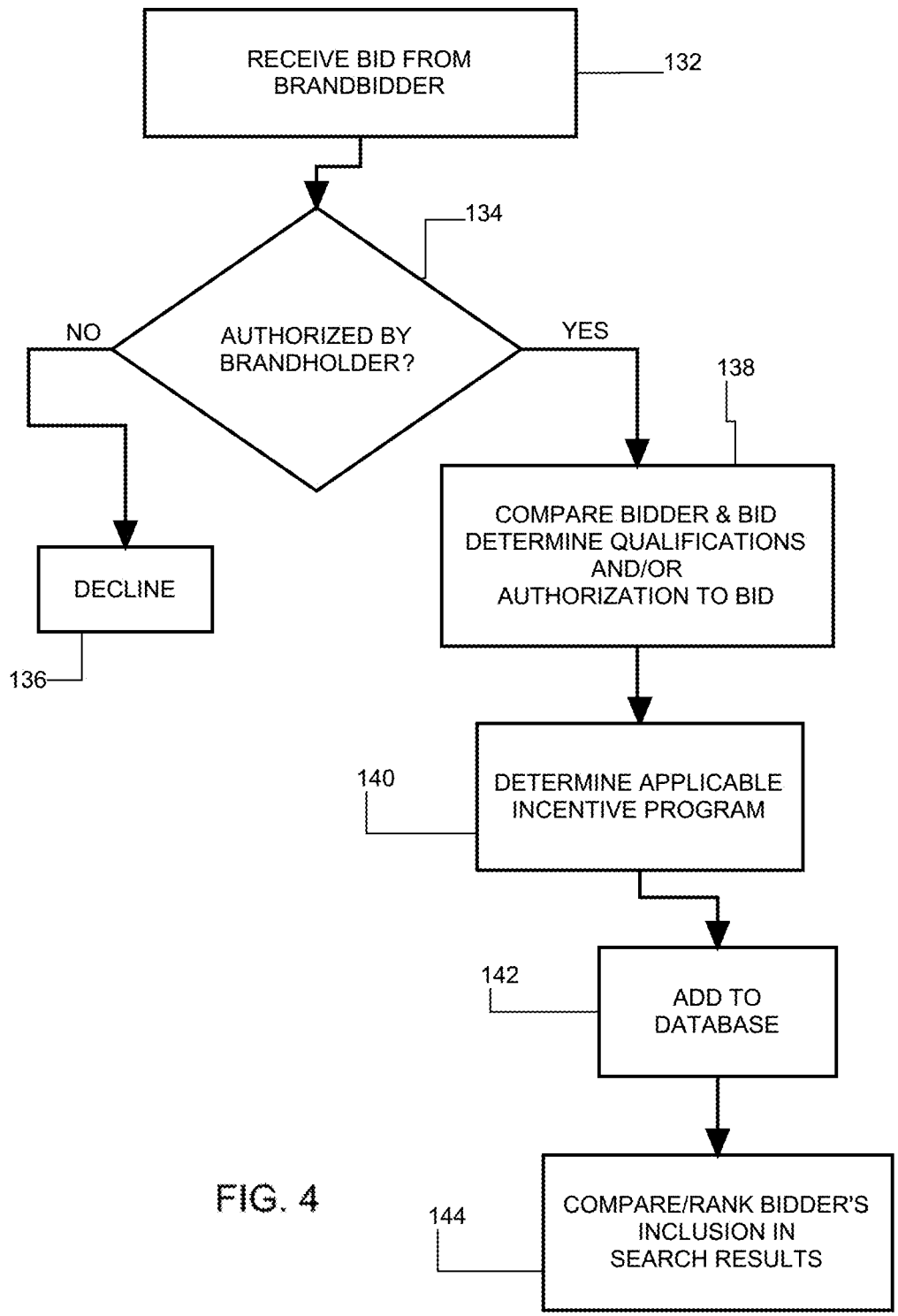
FIG. 4 is a flowchart showing an exemplary embodiment of a method for processing Paid Search bids from Bidders related to Brands included in a brand name database.
Figure 5:
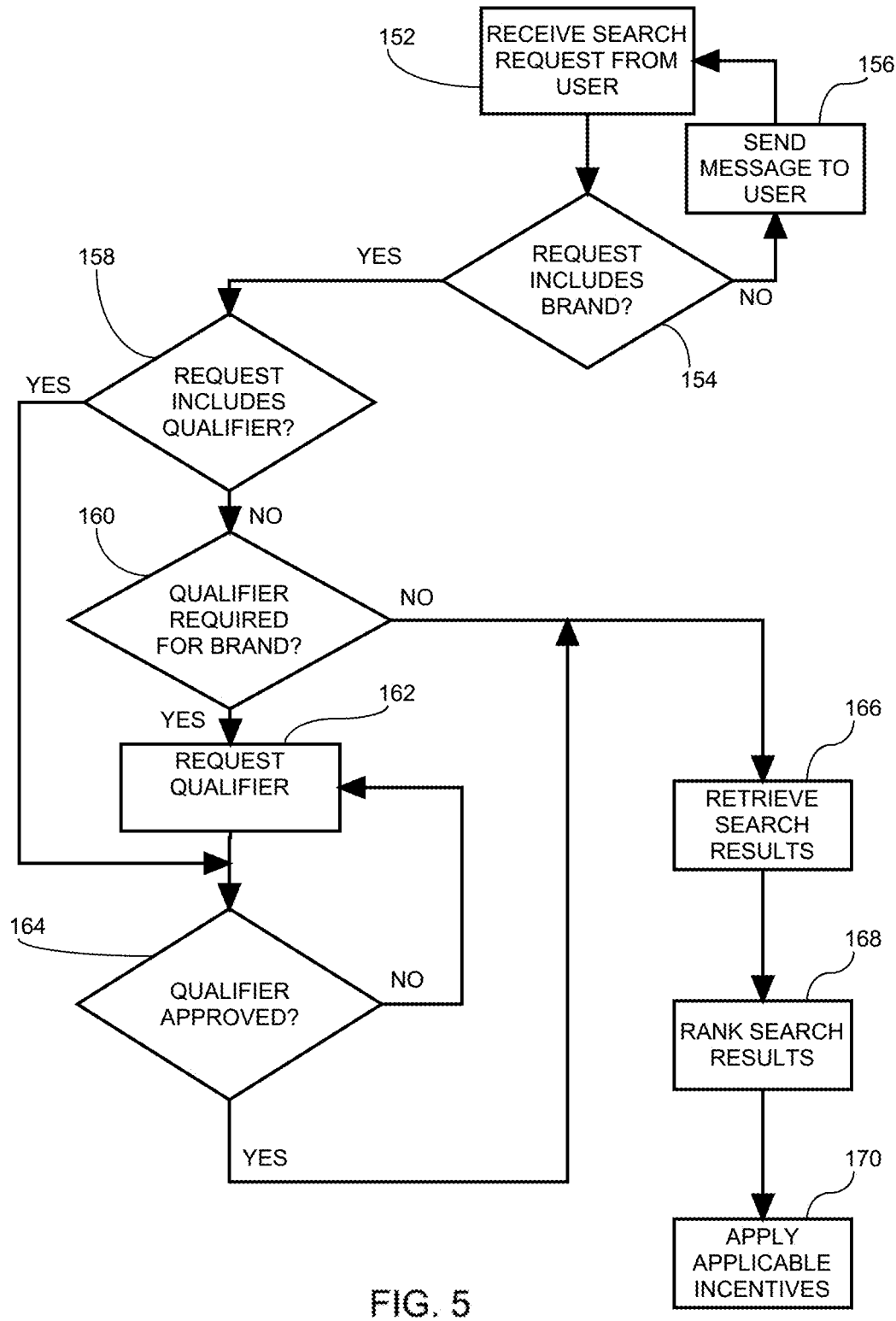
FIG. 5 is a flowchart showing an exemplary embodiment of a method for processing Search Requests including a Brand using a brand name database.

Turning to FIGS. 3-5, exemplary methods will now be described of some of the functions that may be performed using the system 8 of FIG. 1 or other similar system. It will be appreciated that one or more of these methods may be included independent of the others to provide a desired level of functionality in a brand search or other ecosystem, and that the steps described may be performed in different orders than the examples provided and/or that some steps may be omitted, if desired. Further, the system 8 may involve performing many of these functions, e.g., involving many brandholders 70, bidders 80, users of devices 10-n, concurrently and/or independently of one another in response to particular requests or other communications, e.g., received by the database manager 50 and/or search engine 60. It will also be appreciated that any of the specific examples described elsewhere herein may be included, if desired, in any of the exemplary methods described hereafter.

Turning first to FIG. 3, an exemplary method is shown for identifying and including Brands and respective Brandholders in the brand name database 52. At step 102, a request may be received from a party, such as a brandholder 70 via the network 40 shown in FIG. 1, requesting to be associated with a particular Brand. At step 104, the request may be processed, e.g., by the brand processor 56a of FIG. 2, to decide whether to associate the brandholder 70 with the Brand, and/or whether the brandholder 70 should have exclusive or non-exclusive input regarding the Brand. The brand processor 56a may apply predetermined business rules to determine whether the brandholder 70 qualifies to be exclusively associated the Brand and/or the various level(s) of input/control related to the Brand.

For example, the clearing house 90 may establish rules and/or guidelines to provide substantially objective standards for identifying and/or associating Brandholders and Brands, which may be implemented by the brand processor 56a. These may include identifying Brandholders who are members of the consortium overseeing the clearing house 90 and/or otherwise affiliated with the clearing house 90, identifying Brandholders based upon third party standards, such as registered trademark and/or service mark owners, seniority (in time) of incorporation and/or Brand use, and the like. The brand processor 56a may automatically execute these rules and/or guidelines to determine whether the brandholder 70 qualifies for inclusion in the brand name database 52. Alternatively, one or more operators may review requests based upon the existing business rules and/or guidelines, e.g., manually and/or using a computer system coupled or otherwise communicating with the database manager 50 and/or brand name database 52.

If the brand processor 56a (or other operator) determines that the brandholder 70 does not qualify, e.g., based upon an existing Brandholder already having rights to the Brand, the request may be denied at step 106. The brandholder 70 may then be notified, e.g., via the network 40 and/or other communication channel, of the decision.

Optionally, the rules and/or guidelines may include procedures for appealing a decision declining inclusion by the brandholder 70. For example, the clearing house 90 may include one or more managers, panels, committees, and/or other institutions for reviewing, and affirming or reversing decisions, e.g., again based upon the business rules and/or guidelines of the system 8.

At step 110, if the brand processor 56a (or other decision maker) concludes that the brandholder 70 qualifies for inclusion in the brand name database 52, it may be determined whether one or more Qualifiers should be associated with the Brandholder and the respective Brand. For example, two Brandholders in different markets may use similar or identical Brands and need to be distinguished within the brand name database 52.

At step 112, if no such Qualifier is required, the Brandholder and its Brand may be added to the brand name database 52. Optionally, additional information may be included in the brand name database 52 regarding the Brand, Branded Products, and/or Brandholder, e.g., SKUs, lists, descriptions of Branded Products, contact information, and/or one or more optional Qualifiers. For example, the Brandholder may request (in the original or subsequent requests) that certain Qualifiers be associated with the Brandholder and/or the Brand to facilitate subsequent use of the brand name database 52, such as multiple product categories that the Brandholder may manufacture and/or sell, geographic descriptors, e.g., based upon national and/or regional boundaries, and the like. For example, such Qualifiers may also facilitate identifying and/or prioritizing Bidders and/or may be included in Search Requests, as described further below.

At step 114, the brand processor 56a may determine that a Qualifier is required before the Brandholder may be included in the brand name database 52. For example, two Brandholders may both qualify for being associated with the same or similar Brands, e.g., although the Brandholders' respective products may be in different trades, markets, geographic regions, and the like. The rules and/or guidelines of the clearing house 90 may automatically determine and/or associate different Qualifiers with each of the Brandholders to distinguish them, such as product categories, geographic descriptors, and the like. In addition or alternatively, the Brandholders may voluntarily negotiate or may arbitrate necessary Qualifiers to be associated with one or both Brandholders and their Brands. Optionally, the institutions available from the clearing house 90 may enable or otherwise facilitate such negotiations and/or arbitrations, e.g., to help resolve any conflicts between Brandholders to allow both Brandholders to participate in the system 8. If, however, no resolution can be reached, rules may exist to allow one Brandholder to be included and one excluded if necessary, e.g., based upon seniority in time and/or use of the Brand, first to request participation in the system 8, and the like.

At step 116, the Brandholder, Brand, and necessary Qualifiers may be added to the brand name database 52, optionally including additional information, if desired, as described above.

Optionally, at step 118, Brandholders may pre-approve Bidders who may request to be associated with their respective Brands. For example, the rules and/or guidelines may provide the Brandholders with exclusive rights to authorize Bidders to be associated with their Brands. Alternatively, the Brandholders may have input less than exclusive rights to affect Bidders being associated with their Brands. For example, a Brandholder may pre-approve its authorized dealers or other agents or representatives, and/or keep out direct competitors who may try to draw search traffic away from the Brandholder. Alternatively, the Brandholder may pre-approve Qualifiers for Bidders, e.g., product categories, geographic descriptors, and the like, e.g., to facilitate distinguishing its dealers, etc. based upon appropriate factors. In addition or alternatively, the Brandholder may use incentives, subsidies, and the like to support desired Bidders, as described further below.

Figure 6:
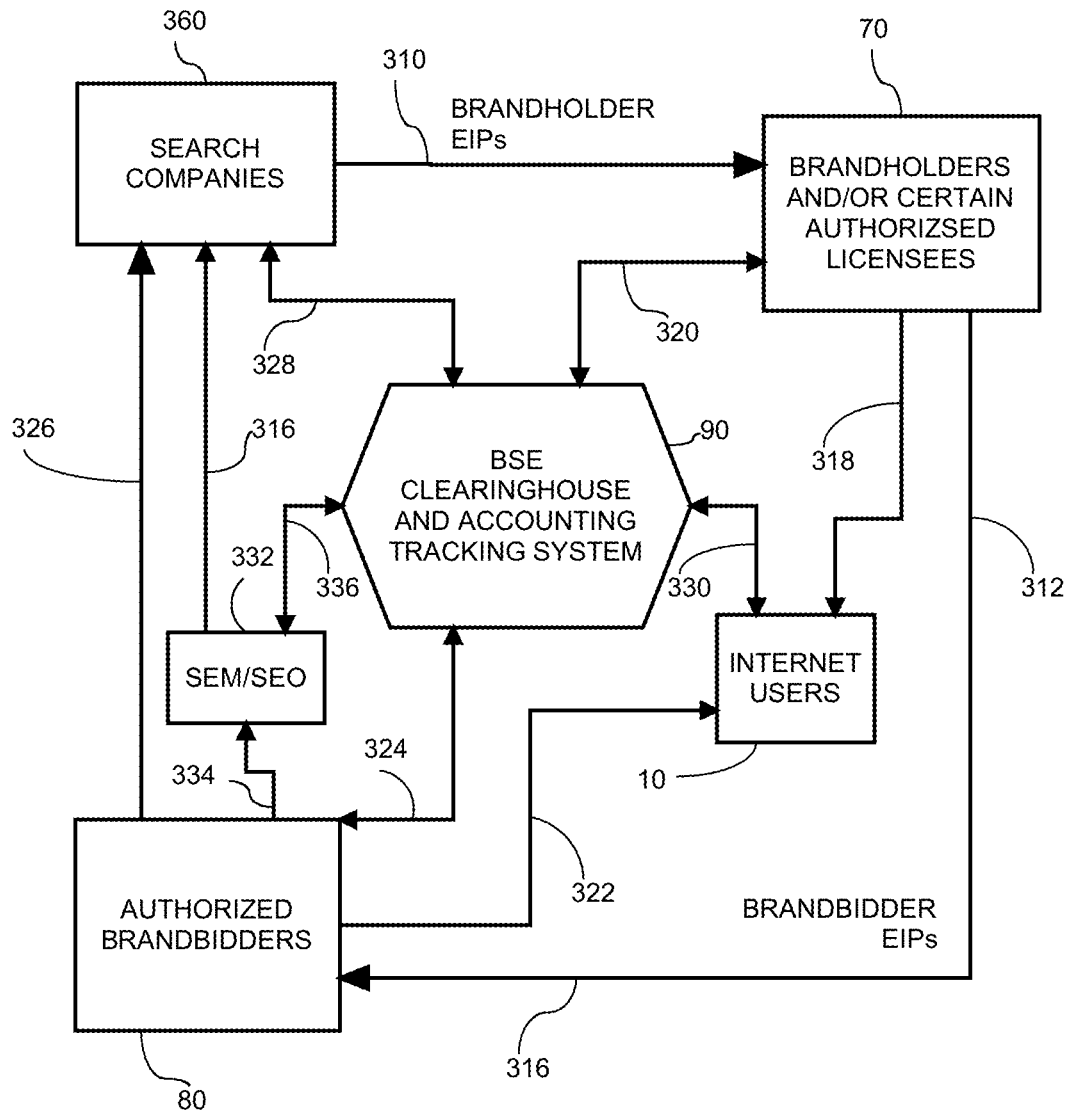
FIG. 6 is a schematic drawing showing an exemplary embodiment of incentive arrangements that may be provided in a brand search ecosystem and associated clearinghouse that may be provided in a brand search ecosystem.
Figure 7:
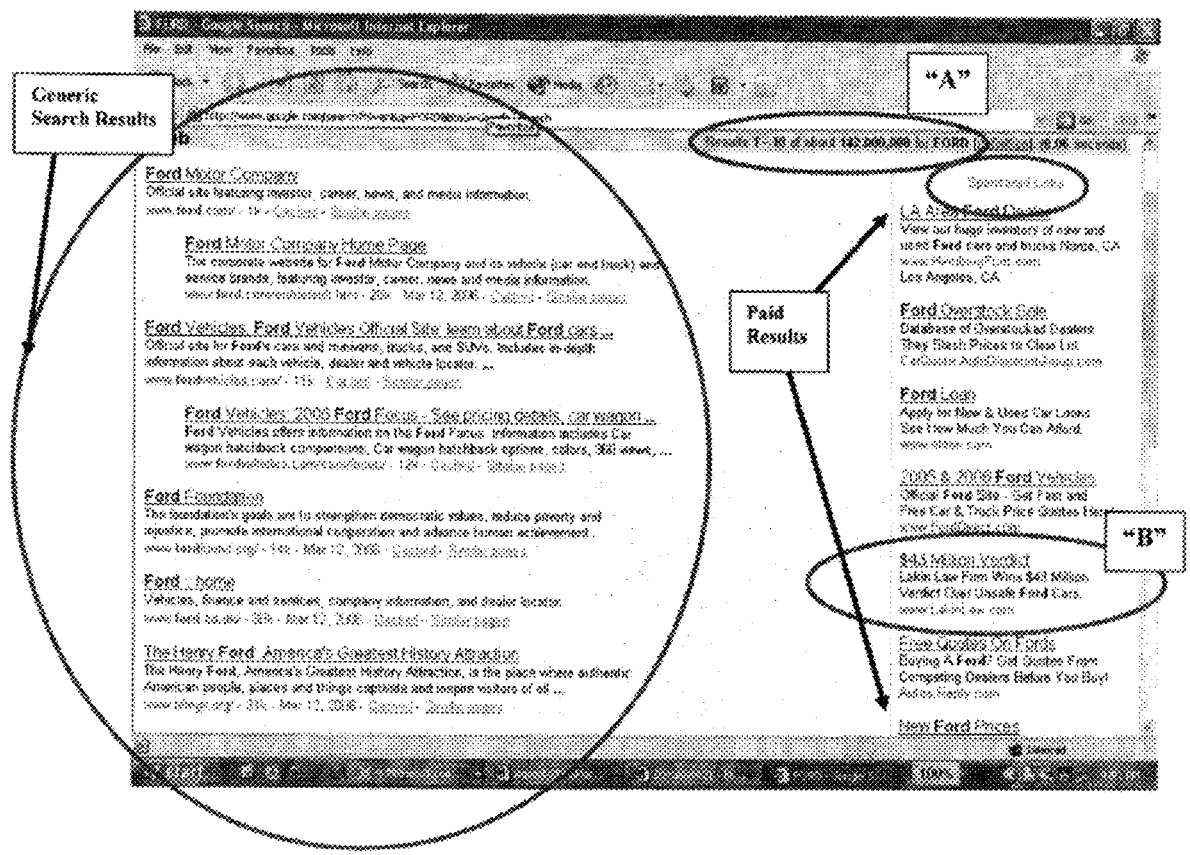
FIG. 7 is an example of the first page of search results for Google Search on the Search Term "Ford" on Mar. 13, 2006.
Figure 8:
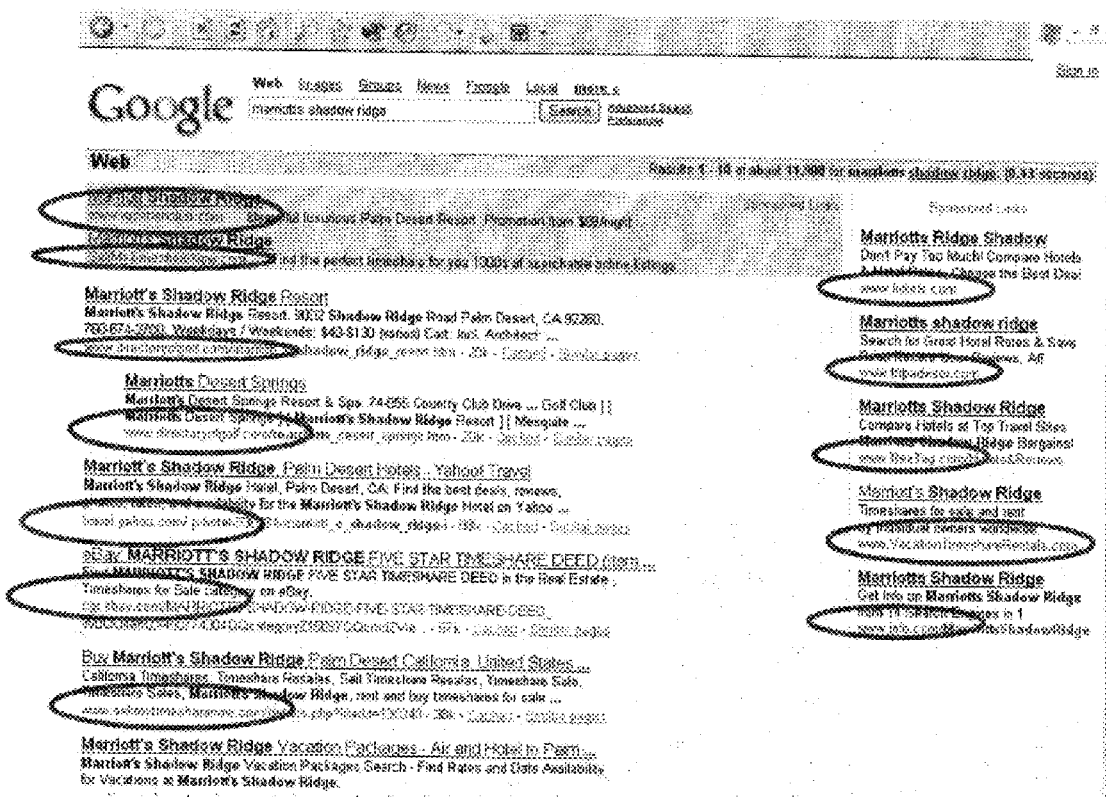
FIG. 8 is an example of the first page of search results for Google Search on the Search Term "marriotts shadow ridge" on Apr. 9, 2006.

In addition or alternatively, at step 120 the Brandholder may establish incentive programs for itself, for relevant Bidders, and the like. For example, the clearing house 90 may establish optional and/or mandatory incentive rules and/or plans, and the Brandholder may elect to participate in or define its level of participation in the available plans, or even establish its own unique incentive program. FIG. 6, which is described further below, shows examples of several incentive programs that may be available in a brand search ecosystem, such as those described herein. Also as described further below, the incentives involved may be financial or non-financial.

For example, as represented by line 310 in FIG. 6, Brandholders may receive incentives, e.g., payments from Search Companies 360, such as the operator of the Search Engine 60 shown in FIG. 1. For example, multiple Search Companies may operate independent Search Engines, similar to Search Engine 60, e.g., in conjunction with or separate from other Search Engines operated by other Search Companies. The Search Companies may pay incentives to the Brandholders based upon bids made and paid by Bidders on the Brandholders' Brands, as described elsewhere herein. Also as described elsewhere herein, such payments or other incentives may be monitored, recorded, maintained, and/or paid by the clearing house 90 or other agent, similar to other incentives described herein.

In addition or alternatively, as shown by line 312, Brandholders may provide incentive fees, subsidies, co-op advertising funds, and the like to Bidders 80, as shown in FIG. 6. For example, the Brandholders may provide incentives to their authorized dealers, advertisers, promoters, representatives, and the like to encourage the Bidders 80 to bid on Search Terms to the Search Companies 360. Such incentives may be offered to all qualifying Bidders 80, to only top tier Bidders 80, e.g., the Brandholders' top ten dealers, and the like, as desired.

Optionally, as shown in FIG. 6, the brandholder 70 may provide incentives 318 to users 10, e.g., to reward users who are loyal customers, and/or payments 320 to the clearing house 90, e.g., to support the services provided by the clearing house 90. These incentive programs may be provided at the Brandholder's discretion or may be required, e.g., as a supporting member or affiliate of the clearing house 90.

Returning to FIG. 3, once the incentive programs are established at step 120, the appropriate information may be added to the brand name database 52 and/or may be maintained by the clearing house 90, as desired. Optionally, the information may be submitted to the brand name database 52 and/or clearing house 90 in one data transfer at the end of processing or in several batches, e.g., after one or more individual steps are completed. Such information may facilitate processing of bids or other subsequent requests and/or communications from Bidders or other participants in the system 8, as described further elsewhere herein.

Turning to FIG. 4, another exemplary method is shown for processing bids from Bidders, e.g., using the bid processor 56b shown in FIG. 2. Initially, at step 132, a request may be received from a Bidder requesting to be associated with one or more Brands. Optionally, in a Paid Search environment, the request may be a Bid, i.e., including a Brand and a price that the Bidder is willing to pay to be associated with the Brand(s). The price may include a per-click-through bid, a maximum budget, and/or other values, similar to the examples described elsewhere herein.

At step 134, the request may be processed to determine whether the Bidder qualifies to be associated with the desired Brand. For example, in an environment where the Brandholder has the right to include and exclude Bidders, if the Bidder is not approved by the Brandholder, the request may be declined at step 136. In addition or alternatively, other factors may be involved in deciding whether to include a Bidder and associating the Bidder with the desired Brand. For example, in a Paid Search environment, the Brandholders, Search Companies, and/or clearing house(s) may establish minimum bids and/or a maximum number of approved Bidders (e.g., approving only a certain number of Bidders) at any time. Optionally, in such an embodiment, a "waiting list" may be established for Bidders that are beyond the established number of Bidders. Thus, the request may be declined if the bid is too low, and/or if the maximum numbers of approved Bidders is already met. The clearing house 90 of FIG. 1 may also have rules and/or guidelines that may be implemented to include or exclude Bidders based upon various business rules, such as reputation, creditworthiness, membership in a consortium associated with the clearing house 90, and the like. In addition or alternatively, the clearing house 90 may include one or more auditors, arbitrators, and the like, to facilitate or review appeals or other issues arising from Bidders who are declined or limited in a manner the Bidders considered improper, similar to the institutions described above related to appeals, etc., for Brandholders who are declined.

At step 136, if a Bidder is approved, the Bidder's request may be processed further, e.g., to determine the Bidder's initial qualifications and/or authorizations. For example, the Bidder's request may include one or more Qualifiers that the Bidder may want associated with the Bidder to limit or qualify its inclusion in Search Results, such as geographic descriptors, product categories, and the like. As an example, a Bidder on a Brand may only want to be included in Search Results based upon a Search Request that includes the Brand alone or that includes the Brand but excludes some geographic regions (e.g., a Bidder engaged in business only in California may include Brand X and exclude if NOT California, if the Bidder wants to be excluded from Search Results that include a state or other geographic descriptor outside California).

In addition, the Bidder may establish a budget, e.g., that the Bidder will pay for the thousand click-throughs, or up to ten thousand dollars ($10,000), and the budget information may be included in the brand name database 52. Thus, during subsequent processing of Search Requests, as described elsewhere herein, the Bidder's budget may be reviewed before including the Bidder in Search Results, and the Bidder may designate that any such budget may be applied with or without regard to any EIPs payable to the Bidder from time to time.

At step 140, the bid processor 56b may determine the Bidder's eligibility for one or more incentive programs and/or determine the Bidder's level of participation. For example, if the Bidder is on an approved dealer list for the Brandholder, the Bidder may be eligible for an EIP or other BSE Incentive from the Brandholder. As described elsewhere herein, such BSE Incentives may allow the Bidder to increase its bid above that of other Bidders, e.g., to increase the Bidder's priority in Search Results. The BSE Incentive may be applied to the Bidder at the time of processing or subsequently, e.g., upon charging the Bidder for inclusion in Search Results, or determined by events subsequent to the bidding by the Bidder or the click-through that results in the payment obligation of the Bidder. Optionally, the Bidder may also decide to participate or be required to participate in providing incentives or other payments to other participants. For example, as shown in FIG. 6, bidders 80 may provide incentives 322 to users 10, e.g., based upon loyalty, purchases, or other factors, and/or make payments 324 to the clearing house 90.

At step 142, the information related to the Bidder, its bid, its participation in incentive programs, and the like may be added to the brand name database 52. The information may be added upon completion of the preceding steps, as shown, or may be added as one or more individual steps are completed. In addition or alternatively, at least some of the information may be communicated to the clearing house 90, e.g., to establish an account for the Bidder, e.g., for processing incentive payments, bid payments, and the like, as described elsewhere herein.

At step 144, the database manager 50 and/or search engine 52 may perform one or more functions involving the Bidder's information when Search Requests are received and/or processed. For example, the Bidder's bid and status may be compared to other bidders at the time a Search Request is received to determine the Bidder's inclusion and/or priority in Search Results. For example, if since the Bidder's original bid, another bidder has placed a higher bid that removes the Bidder from the top number of bidders authorized to be included in Search Results, the Bidder may be excluded from the Search Results. Alternatively, if the Bidder's budget has been exceeded, the Bidder may also be excluded from the Search Results. Optionally, when these events occur, a notice may be sent to the bidder 70, e.g., via the network 40, as shown in FIG. 1, or other communication path, of the event. This may provide the Bidder with the opportunity to submit a new bid, e.g., increasing its bid price and/or budget, which may be processed beginning at step 132, as described above. Thus, the receipt and processing of bids, and/or inclusion in Search Results may occur dynamically during operation of the system 8.

Turning to FIG. 5 with additional references to FIG. 1, an exemplary method is shown for processing Search Requests including Brands, e.g., to determine and/or provide appropriate Search Results. At step 152, a Search Request may be received, e.g., by the search engine 60 of FIG. 1 from a user device 10 via the network 40. The Search Request may include at least one Brand, and the Search Request may include other information, e.g., one or more Qualifiers. For example, user device 10 may access the search engine 60 via the Internet or other network 40, e.g., accessing a webpage presented by the search engine 60. The webpage may include a space for the user to enter search terms, e.g., in a free-form manner. Alternatively, the webpage may include multiple spaces, e.g., one space for entering a Brand, and another space for entering one or more (optional or required) Qualifiers. In a further alternative, a multiple choice menu, pulldown menu, or other interface may be presented to the user, e.g., to facilitate entering one or more Qualifiers. It will be appreciated that a variety of interfaces may be provided to users to facilitate initiating a Search Request.

At step 154, the Search Request may be processed to determine whether the Search Request includes a Brand existing within the brand name database 52. If no Brand is included in the Search Request or if the identified Brand does not exist within the brand name database 52, a message may be sent to the user at step 156. Optionally, the user may be provided with another opportunity to enter a Brand, e.g., returned to step 152 as shown, may be provided with a list of one or more Brands similar to the term included in the Search Request, depending upon the Search Algorithms used by the search engine 60, or may be provided Search Results without regard to the special features of the BSE.

At step 158, if a Brand existing in the brand name database 52 is identified in the (initial or subsequent) Search Request, the search engine 60 may determine whether the Search Request includes one or more Qualifiers. If no Qualifier is included in the Search Request, at step 160, the search engine 60 may determine whether a Qualifier is required. For example, as described elsewhere, multiple Brandholders may have rights to the same or similar Brands, and Qualifiers may be required to distinguish the Brandholders. If no Qualifier is required, the search engine 60 may process the Search Request to obtain Search Results, e.g., using the procedures described further below.

If, however, the search engine 60 determines that one or more Qualifiers absent from the Search Request but are required, at step 162, the search engine 60 may request further information from the user. For example, the search engine 60 may simply request that the user provide additional terms, e.g., products, geographic descriptors, and/or other terms to further refine the search, or one or more menus may be provided to the user, e.g., including a list of optional Brandholders having rights in the Brand, and/or a list of Qualifiers for the user to select. The interface for such a request for additional information may be similar or different from the interface provided for the initial Search Request.

At step 164, the additional information received from the user may be processed to confirm that it includes an appropriate Qualifier. If the information does not provide sufficient information, the user may be returned to step 162 and/or may be provided with a list of possible options responsive to the Search Request, e.g., a list of possible Brandholders having rights in the Brand.

At step 166, once one or more appropriate Qualifiers or additional information is received (or no Qualifier is needed, e.g., at step 160), the search engine 60 may access the brand name database 52 to retrieve information responsive to the Search Request. Optionally, all of this information may be provided to the user as a Search Response. The interface and/or other presentation of the information may be in any useful or desirable format. For example, each piece of information may include a description, geographic location identifier, and/or a URL of the Bidder or the Bidder's stores, e.g., including an active icon that may clicked to forward the user directly to a website or other location associated with the Bidder.

Alternatively, at step 168, the information from the brand name database 52 may be prioritized and/or edited before being provided to the user. For example, in a Paid Search environment, information may be ranked based upon the amount bid by Bidders, e.g., such that the Search Results include the highest Bidders first or Bidders whose budgets have been exhausted are omitted. In addition or alternatively, in an environment where the Brandholder has authority over information associated with its Brand, information from authorized Bidders or Vendors may be provided, either before other information or exclusive of other information. In addition or alternatively, other Search Algorithms may be applied, e.g., if the Search Request includes one or more Qualifiers that need to be analyzed before providing the Search Results. For example, if the Search Request includes a geographic descriptor, e.g., a location where the user is or intends to be, the information associated with the Brand may be ranked based upon proximity to the location. The information may then be sent or otherwise presented to the user as the Search Results.

In addition, at step 170, any incentives applicable to the Search Request may be processed, e.g., before, while, or after, providing the Search Results to the user. For example, with additional reference to FIG. 6, if the user selects a Bidder, e.g., by clicking through to a Bidder's website, a payment may be made to the Brandholder, e.g., as shown at 310. The payment may be based upon the rules of the clearing house 90 and/or an arrangement between a Search Company operating the search engine 60 and the Brandholder, as described previously. In addition or alternatively, the selected Bidder may make a payment to the Search Company and/or to the Brandholder, e.g., a per click bid price to the Search Company, as shown at 326. In addition or alternatively, the Brandholder may make a payment to the selected Bidder, such as an EIP or other BSE Incentive, or other payment to an authorized or favored Bidder shown at 312, e.g., based upon the programs established by the clearing house 90 and/or between the Brandholder and the Bidder.

Any such payments may be made directly from the payer to the payee. Alternatively, the payments may be made to and/or from the clearing house 90, and/or may simply be acknowledged, recorded, and/or monitored by the clearing house 90, e.g., in the appropriate participants' accounts as shown at 316, 320, 324, 328. The clearing house 90 may then periodically reconcile participants' accounts, e.g., making net payments, charges, and the like.

Optionally, if the incentives include the user, the incentives may be provided to the user 10 at 318, 322, and/or 330. Such incentives may include a cash payment, a discount on an existing or future purchase, and the like.

Although not discussed during the methods above, other third party participants may also be involved in the methods and/or transactions described above. For example, as shown in FIG. 6, one or more SEMs and/or SEOs may be involved, e.g., acting on behalf of Bidders 80. For example, the SEMs and/or SEOs may process bid requests and/or payments for Bidders 80 directly or through the BSE Clearinghouse, e.g., as shown at 336. Bidders 80 may pay the SEMs and/or SEOs in advance or after being included in Search Results, upon receiving subsidies or other incentives from Brandholders, and the like, as shown at 334.

Overview of the Brand Search Ecosystem

As can be seen from the foregoing, the systems and methods described herein may provide Brandholders with input and/or control over Search Results involving their Brands. What now follows are examples of a Brand Search Ecosystem or BSE that may be used to perform one or more of the features described above. The BSE may provide Brandholders additional tools and/or an integrated system to protect and/or have Input regarding the use of their Brands in an Internet Search environment. It may allow Brandholders to participate in the economic value of their Brands and/or may provide tools allowing them to control, protect, incent, allocate, and otherwise work with their Brands' authorized licensees, distributors, resellers, service companies, and the like to legitimately promote, assist in providing more relevant search results, and/or protect their Brands in the Internet Search ecosystem. Certain aspects of the BSE may work with all types of Internet Search and contextual advertising outside of search, and certain aspects may apply more to Organic Search Results and some aspects may apply more to Paid Results and contextual advertising.

In the BSE, Paid Search Results may not be limited to Search Results determined only by Brandholders, but rather by the Search Companies, Brandholders and/or other stakeholders in the Brands. Legitimate Brandholders may have input into the Search Algorithms associated with both Organic Search Results and/or Paid Search Results, and/or other related factors, including what companies are authorized to place Bids on Search Terms, the ranking and display of Search Results, and/or various other rules and formulas in the Search Algorithms.

A Brandholder that owns a Brand certainly owns the right to protect the Brand and accordingly may have the primary input into the use of the Brand. However, there may also be various other legitimate users of the Brand, such as licensees, people who sell used products or replacements parts for Branded Products, etc. (e.g., Ford dealers, Ford automotive repair shops, etc. and others.). Under the BSE, however, Brandholders may be entitled to establish certain parameters and/or limitations on which companies may Bid on Branded Search Terms. The nature and extent of these parameters and limitations may be determined as the BSE evolves and is deployed.

BSE Search Alliance

In order to further the cause for the BSE and/or to help fairly implement various aspects of the BSE, the BSE may include the formation and/or association with one or more new, non-profit trade associations (the "Trademark Search Associations"), which may be responsible or have the power to undertake various actions and activities designed to protect the interests of Brandholders, Internet Users, Advertisers, and/or other participants in the BSE. The Trademark Search Associations may provide various functions related to the BSEs, including assisting in establishing rules and structure for the system, promoting and operating the system, conflict resolution, etc. and such Trademark Search Associations may specialize for certain industries.

Specific Proposals that may be Included in the BSE

This description has outlined the background and rationale for the BSE, as well as some of the objectives and premises of the BSE. Set forth below are various specific proposals, one or more of which may be included in the BSE that may help efficiently meet the objectives and/or provide BSE Participants with the tools and systems necessary to achieve those objectives.

1) To minimize or eliminate ambiguity or doubt, Internet Users may be able to affirmatively designate that they want to conduct a search request in, or have the Search Results affected by, the BSE through the use of a tab, radial button, the selection of a BSE identified Search Request box itself, the use of a special term or identifier in the Search Terms, and/or some other methodology.

2) Various Search Terms and/or Search Logic Terms may be used to automatically identify that Internet Searches are intended or need to have the Search Results affected by or conducted with the brand search benefits of the BSE. Typically, these words may be treated as automatic affirmative designation by the Internet User to "opt in" to the BSE instead of the normal Internet Search system.

3) Various categories and/or other terms included in Search Terms may be used as triggers and/or interpreted to mean that the User would prefer to have Search Results from, or affected by the BSE.

4) Whether or not Search Companies utilize the BSE to deliver or impact Search Results may be determined by any and all parameters available as part of the context of the Search Request that may be known or determined from any source, including the platform upon which the Search Request is made, the Search Terms included in the Search Request, the time of day, the history of the User and the User's prior Searches, the immediately past and historically tracked searches and clicks of the User, the nature of the content related to the Search, and/or any other contextual information available to, or deliverable by, the BSE (collectively "Search Context").

5) In addition to using the Search Context to determine whether or not to utilize the BSE, the Search Context may be considered in determining and impacting Search Results under the BSE.

6) Brandholders may have input and/or control over the business rules and Search Algorithms used to determine Organic Search Results and/or Paid Search for Branded Searches for certain Brands (i.e., searches that use Search Terms including their Brands), including but not limited to a) determining business rules, systems, and/or formulas that determine which categories of businesses and/or specific businesses ("Authorized Brand Licensees" or "Authorized Brandbidders") are authorized to Bid on Branded Search Terms including a Brandholder's Brands, b) establishing bidding minimums and/or maximums for Branded Search Terms or requiring links from Branded Search Terms to link to certain types of Content specifically related to the Branded Search Terms, etc., c) various rules, systems, and/or formulas to limit, impact, or allocate the nature of the Branded Search Terms or EIPs (defined elsewhere herein) that are available to any specific Authorized Brandbidder or specific categories of Authorized Brandbidders that are authorized to Bid on Branded Search Terms and/or d) various rules, systems, and/or formulas included in Search Algorithms that take into account words, tags, or other factors controlled or impacted by Brandholders in determining the inclusion and/or ranking of Content in Organic Search Results or Paid Search Results. These examples may be used alone or together to provide Brandholders with BSE Input capability.

7) Placing, monitoring and/or reporting restrictions on the products and services that may be sold on the websites that are advertised through the use of Branded Search Terms, including requiring the actual monitoring of sales of the Branded Products and/or the sales of other, non-Branded products on the websites or properties of Authorized Brandbidders.

8) Brandholders may be given access to certain information, either on an Advertiser by Advertiser basis or perhaps in a way that the Brandholder may only see aggregated or based on "blind" reporting of information that is sensitive or otherwise should not be shared between BSE Participants. To achieve this objective, various aspects of the BSE may be performed, tracked, and/or reported on a blind or double blind basis by the operators of the BSE, trade associations or other organizations as a trusted agent for all participants.

9) The BSE may include a variety of economic incentives ("Economic Incentives") that may be paid to/from various BSE Participants. The term "BSE Participants" may include Search Companies, Brandholders, SEMs, SEOs, Advertisers, Affiliates, Website Operators, Branded Bidders, Internet Users, other users, and/or any person or entity that has reason to participate directly or indirectly in the BSE. A diagram of some of the various BSE Participants and some of the various Economic Incentives is shown in FIG. 6. Brandholders may be entitled to participate in a portion of the income received by Search Companies for Paid Advertising on their Branded Search Terms and/or other Search Terms related to, associated with, or included with Branded Search Terms in Brand Search Requests. These EIPs to the Brandholder may be completely unrestricted or may be required to be used for certain types of activities. Alternatively, these Economic Incentives may be required to be or otherwise allocated to reserves, holding accounts and other tracking and accounting approaches (collectively "Reserves"), which may require that the funds be available for use in the future pursuant to various agreements between Brandholders, Search Companies, Authorized Brand Licensees, etc. The Reserves may also be used to secure ongoing obligations of the various BSE Participants in the BSE and/or to ensure continuing compliance with the various ongoing obligations of BSE Participants.

10) Brandholders may be authorized to provide financial incentives and/or subsidies to Authorized Brandbidders or others authorized to Bid on Search Terms including the Brandholder's Brands.

11) Brandholders may be able to designate that a portion of Bids made by an Authorized Bidder be paid for or subsidized by the Brandholders to the Search Companies directly (whether credited to the account of an Authorized Brandbidder or not) or offset against any EIP otherwise due the Brandholders, or Brandholders may be able to subsidize Bids placed by Authorized Brandbidders, either by paying the amounts directly to the Search Companies or paying such amounts to the Authorized Brandbidder directly.

12) Any Economic Incentive or other payments or incentives provided by a Brandholder may be based on a flat fee per bid or based specifically on subsidizing Bids and Paid Search Fees paid to one or more specific Search Companies by an Authorized Brandbidder on a subsidy per Bid, percentage of Bid, or any other basis. For example, a Brandholder and Authorized Brandbidder may agree that a flat fee per Bid EIP may be adjusted based on how much the Authorized Brandbidder Bids or pays on the Brandholder's Brands compared to how much the Brandbidder bids or pays on Search Terms associated with the competitors of the Brandholder.

For example, Brandholder X may agree to a standard Paid Search Result EIP for Authorized Brandbidders A and B of $1.50 per Bid payment on the Brandholder's Brands. Alternatively, the Brandholder and the Authorized Brandbidders may agree to adjust the EIP based on the ratio of each Brandholder's Bids for the Brandholder's Brands compared to such Brandholder's Bids for the Brands of the Brandholder's competitors. So, if ninety percent (90%) of the total Bid payments for Brandbidder A are for the Brandholder's Brand and only thirty percent (30%) of the total Bid Payments for Brandbidder B are for the Brandholder's Brands, then Brandbidder A's EIP percentage or amount may be adjusted higher than Brandbidder B's adjusted EIP.

13) The BSE may provide for the establishment, tracking, monitoring, controlling, accounting, and/or adjusting of the various EIPs and other payments and subsidies payable to or from any Participant.

14) All of the various EIPs, authorizations, tracking, and/or other operational features of the BSE may be accounted for in an accounting and tracking system (the "BSE Clearinghouse") that may serve as a clearinghouse for authorizing, trafficking, tracking, reporting, and/or accounting all aspects of the BSE, e.g., on a real-time basis, including the licensing and authorizing of Authorized Brandbidders and/or any BSE Incentives, including EIPs due and payable to/from any BSE Participant. BSE Participants may have the ability to track, monitor, alter, approve, and/or obtain any terms, descriptions, images, etc. and other advertising or promotional information (collectively, "Creative") on all aspects of the BSE relative to their authorized Brands through the BSE Clearinghouse, e.g., on a real-time basis through web interfaces or other means, including EIPs provided by Brandholder to Authorized Brandbidders, and the total advertising fees paid by a Brandbidder may be credited, reimbursed, or otherwise accounted for in the BSE.

15) The BSE Clearinghouse system may detect and account for various types of goods and services associated with the Brand and Content of BSE Participants related to the Brands, including Internet and non-Internet sales of Branded Products. Similarly, the BSE Clearinghouse may detect and account for various non-BSE economic or other incentives related to the Brands, including promotions, rebates, coupons, non-Internet and Internet co-op advertising funds and incentives, and the like.

16) Organic Search Results may also be impacted from the various components of the BSE, including altering the BSE Search Algorithms to consider any Brand information from the Brandholder and Authorized Brandbidders.

17) The BSE may be used to establish, monitor, and/or report on Branded Search Terms and other Search Terms being Bid upon and/or purchased by certain categories or characterizations of all BSE Participants, and the BSE may track ratios and portions of various similar or competitive Bidded, non-bidded, or combined Bidded or non-bidded Search Terms being bidded or used by BSE Participants in the BSE.

18) The BSE may have various methods of reporting, monitoring, and/or adjusting BSE Incentives, including voluntary systems whereby Authorized Brandbidders agree to disclose and report on all Bidded Terms.

19) The BSE may involve one or more series of rules and regulations to which all BSE Participants may be required to be subject to, or alternatively that Brandholders and Authorized Brandbidders may agree to be subject to. It is anticipated that there may be numerous approval, review, and/or dispute resolution processes and systems in place, involving committees and panels that may be able to address, mediate, and/or arbitrate various disputes, whether arising from conflicts among Brands, Search Companies, Authorized Brandbidders, or others.

20) The BSE may also involve the establishment of guidelines, standards, and/or systems designed to assist Search Companies in finding the most relevant Brand and Branded Products information to be included in both Organic Search Results and Paid Search Results with standardized interfaces and XML language interfaces to allow any BSE Participant to interface with the BSE, the BSE Clearinghouse, and/or other BSE Participants. This may assist Search Companies in determining which pages to crawl, or using specialized systems for BSE Participants for crawling to obtain information from BSE Participant's websites, appropriate optimized indexing of information to take into account BSE factors, and/or inclusion or prioritization of Search Results to provide more targeted and relevant Search Results for both Organic Search Results and Paid Search Results.

21) The BSE may also be used to assist Brandholders and Authorized Brandbidders to distribute appropriate information about Branded Products through a standardized and open architecture which, importantly, may have all of the functionality of the BSE associated with such information.

22) All of the various Economic Incentives may be offset and netted against other Economic Incentives or amounts due to or from BSE Participants.

23) Paid Search Results and other relationships among BSE Participants may be effected through the BSE Clearinghouse directly without going through Search Companies, and Economic Incentives may be paid directly to or from any BSE Participants, including payments from Brandholders to Authorized Brandbidders, Internet Users, Website Operators, Internet Users, Content providers, etc. in ways that do not require the Search Companies to act as intermediaries. For example, Brandholders may provide EIPs directly to BSE Participants for the placement of links or tags on a BSE Participant's website, and BSE Participants may provide incentives to Internet Users to place certain tags or links on their own sites or to establish a Brandholder's Brand as a preference to encourage repeat usage of Brandholder's sites or Branded Searches.

EXAMPLES

Example 1

Economic Incentive Payments to Brandholder

An auto manufacturer with a prominent brand, e.g. Toyota, decides to allocate a portion of its internal and external search marketing efforts to work with one or more BSE Search Companies. The following table sets forth an example of certain Brands, Per Search Amounts (amount paid by a Brandholder to a Brandbidder on a per search click-through basis) and Per Search Percentages (amount paid by a Brandholder to a Brandbidder as a percentage of the amount bid by the Brandbidder to be included in Search Results) that Toyota and a BSE Search Company (an entity operating a BSE Search Engine) might agree upon for the various Brands to be covered by the BSE Algorithm and any EIPs for each brand. The BSE Search Company and Toyota may agree that the BSE Search Engine will pay an EIP to Toyota equal to the greater of the Per Search Amount or the Per Search Percentage for any amounts bid and earned on any BSE Paid Search Revenues incorporating one or more Toyota Brands ("Non-Exclusive Brand Searches") (e.g., Toyota Car Dealer, Toyota Trucks, etc.), and a different Per Search Amount or Per Search Percentage for any amounts bid and earned on any BSE Search Revenues for paid searches incorporating ONLY one or more of the Toyota Brands (e.g., Toyota, 4Runner, or Toyota 4Runner), thereby providing more consideration to Toyota when BSE users use Toyota's brand exclusively in their search. In addition, the BSE Search Engine and the Brandholder may agree upon the maximum EIPs for these types of searches.

The following table illustrates a few potential scenarios for EIP payments:

| Brand | Exclusive Brand Search (e.g. Toyota, 4Runner) | | | Non-Exclusive Brand Search (e.g., Toyota car, 4Runner new car) | | | Multiple Brand Search (Toyota 4Runner, Toyota Camry) | | |
|---|---|---|---|---|---|---|---|---|---|
| | Min. Search Amt. | Pcnt. Search Amt. | Max. Search Amt. | Min. Search Amt. | Pcnt. Search Amt. | Max. Search Amt. | Min. Search Amt. | Pcnt. Search Amt. | Max. Search Amt. |
| Main Brand: | | | | | | | | | |
| Toyota | $.50 | 40% | $1.50 | $.25 | 25% | $ .75 | $.50 | 50% | $3 |
| Products: | | | | | | | | | |
| 4Runner | $.15 | 25% | $3 | $.05 | 10% | $1 | $.25 | 30% | $5 |
| Corolla | $.50 | 40% | $1.50 | $.25 | 25% | $ .75 | $.50 | 50% | $3 |
| Camry | $.15 | 25% | $3 | $.05 | 10% | $1 | $.25 | 30% | $5 |
| Product Features: | | | | | | | | | |
| Vehicle Stability Control ™ | $.15 | 25% | $3 | $.05 | 10% | $1 | $.25 | 30% | $5 |

The relevant Paid Search Revenues may be based on the number of times that BSE Brandbidders bid on the foregoing Brands and the Paid Search Revenues generated by the Search Company on these Brands, and the BSE Search Company may ultimately pay Toyota an amount based on the quantity and pricing of click-throughs pursuant to the agreed upon EIP formula(s). Such payments may be in the form of cash and/or a credit against future Brandbidding by Toyota, or any other economic or non-economic incentive.

This EIP may presumably bear some correlation to the value of the Brand, which is logical and equitable insofar as the Brandholder owns the Brand. Further, the economics of the payments may also have some correlation to the value of the products and services associated with the Brand, and the propensity of end users to be looking for, and clicking Search Results related to, such Brand. A Brand that is not very valuable will not yield a very large EIP, nor will it generate much BSE revenues or EIPs. Conversely, a valuable Brand may presumably generate more Paid Search revenue related to the Brand, and thus the holder of a valuable Brand may be entitled to and presumably earn larger EIPs.

Example 2

Economic Incentive Payments to Brandbidders

Continuing with the example of Toyota as a Brandholder, the Brandholder may agree to pay EIPs to various authorized dealers, resellers, customers, parts suppliers, and the like as Brandbidders, that were actively bidding on Branded Search Terms using the Toyota Brands. This may be logical and/or equitable because Toyota has a significant economic incentive to drive end users to Toyota authorized dealers, parts suppliers, and the like, and to encourage those authorized Brandbidders to bid on these terms and to incent them to bid higher in order to increase the probability of a successful bid that may drive consumers searching for Toyota Brands and Toyota Branded Products to the Content of authorized Brandbidders, thereby presumably ultimately allowing Toyota to sell more products, build more customer awareness and satisfaction with the Brand, etc. For example, Toyota may agree to pay its authorized dealers an EIP on any BSE search incorporating one or more Toyota Brand Names (e.g., Toyota Car Dealer, Toyota Trucks, etc.) equal to the greater of fifty cents ($0.50) or twenty-five percent (25%) of the amounts bid by the Brandbidder on any BSE search revenues incorporating one or more Toyota Brand Names (e.g., Toyota Car Dealer, Toyota Trucks, etc.), and the greater of one dollar ($1.00) or forty percent (40%) of the amounts bid on any Branded Search Term that was exclusively a Toyota Brand (e.g., Toyota, 4Runner, or Toyota 4Runner). Toyota and the Brandbidder may agree to different BSE Incentives, including EIPs for various Brands on different BSE Search Companies to provide maximum flexibility.

Example 3

Automated and Real-time Input from Brandholders

Virtually all Brandholders, whether they are commercial enterprises (e.g., Toyota), individuals (e.g., Madonna), or alliances and organizations (e.g., Chambers of Commerce) operate their own website(s) and utilize these websites for the organization, acquisition, and/or distribution of information related to their products and Brands. They may spend a great deal of time and effort updating the information on their website(s), potentially utilizing SEOs and SEMs, to ensure that the website(s) are found in Search Results, and obtaining and handling more visitors and traffic.

In many cases, the Brandholders may provide extensive and detailed information about their products (e.g., operating manuals, operational guidance, replacement parts, etc.) and/or locations (e.g., stores, store hours, products and services available at the store, inventory, specials, etc.). This information may be voluminous and extremely dynamic and detailed, yet it may often be the best source of information about the Brandholders' products available at any given time. Because of the accuracy and/or depth of this information, Search Companies may agree with the Brandholder that the Search Engine can crawl the website in special ways on a daily or more frequent basis to ensure that the information contained in the Search Engine database is the most accurate and complete information available. Alternatively, the Search Engine may be provided discrete access to portions of information on the Brandholder's web site that may be accessed directly on a real-time basis for inclusion in Search Results.

In order to control the Content on the web site and/or to ensure that the Brandholder obtains the benefits (economic and otherwise) of this Content on an exclusive basis, and/or to ensure that other non-authorized companies do not crawl the website to obtain this information for unauthorized use, the Brandholder may also structure its web site or portions of its website in ways to ensure that other non-authorized website crawlers or systems are unable to gain access to this information. Thus, the BSE Search Companies that work directly with the Brandholder may have an advantage in their ability to deliver more relevant search results to Internet Users. In order to compensate the Brandholder for this effort and to provide them the benefit of their Brand and information, the Search Companies may agree to provide BSE Incentives to the Brandholder or otherwise alter their Search Algorithms in various ways agreed upon between the Brandholder and the Search Engine, and the Brandholder and the Search Engine may further agree to provide BSE Incentives to authorized Brandbidders pursuant to the BSE.

Example 4

EIPs and other Provisions Regarding Similar or Identical Brands

There are certain Brands that are the same or similar but typically relate to different products. For example, Waterford is a brand used and trademarked by both a company that makes crystal and a company that owns and leases apartment buildings. Because of the similarities in the Brand, the BSE Algorithm may incorporate various systems and/or business rules to attempt to arbitrate searches and/or to arbitrate issues among the Brandholders in order to deliver to end users the most appropriate responses and/or maintain the integrity and efficacy of the BSE system.

For example, EIPs may be established among Brandholders of various identical or similar Brands and BSE Search Companies, and these EIPs may be different for each product category. In the forgoing example, the EIP from the BSE Search Engine to the Brandholder for Waterford crystal may be the greater of fifty cents ($0.50) and twenty five percent (25%), with a maximum of four dollars ($4.00), and/or the EIP from the BSE Search Engine to the Brandholder may be the greater of two dollars and fifty cents ($2.50) and fifty percent (50%), with a cap of twenty dollars ($20), partially because of the size of the expected bids and click-through for apartments vs. crystal, and partially because of the expected volume and/or size of bids for Waterford apartments vs. Waterford crystal. In addition, BSE Search Companies and Brandholders of similar Brands may agree to deliver search results based on the nature of the terms searched (Waterford stemware vs. Waterford real estate) or a variety of other contextual factors that may be appropriate—geography, time of day, personal or other information regarding the user (e.g., demographic information, etc.) or circumstances (e.g., at home, in a car, in a commercial plane, and the like), surrounding nature and conduct of the search, and the modality of the search device (e.g., phone, TV, internet, kiosk, commercial transportation, speech recognition, and the like). In the BSE, the Brandholders may have input into the various BSE Algorithms used to parse these types of search requests. It is expected that BSEs may have various methodologies for facilitating agreements, arrangements, and/or resolving disputes between Brandholders holding similar Brands, including methods for establishing various BSE Economic Incentives and BSE Non-economic Incentives, and EIPs.

Example 5

Use of BSE Incentives for Celebrity Names and Terms

As described elsewhere herein, in addition to trademarked and other similar names and Brands associated with goods, products and services, BSE Search Engines may be designed to provide the benefits of BSE search to individuals and others who might be entitled to protect their names and/or earn EIPs regarding their and other names, including their own personal names, such as celebrities, athletes, politicians, and others (collectively, "Celebrities"). These "Brands" may be the celebrity name alone, or the celebrity name associated with some particular product, service or information. Examples of such Celebrities may include Madonna, The Beatles, and examples of the association of such names with particular products or services may be Madonna Ringtones, Madonna Wallpapers, and the like. The BSE Search Engine may simply substitute the celebrity name for, and otherwise treat it like a trademarked or other Brand, or it may apply special attributes and rules of the BSE associated with celebrity names and related terms.

Example 6

Use of BSE Incentives for New and Otherwise Unprotected Terms

Even in situations where Brandholders and others did not have legally or otherwise protectable rights, the BSE might allow persons to acquire protection and/or agree to pay EIPs for such terms to such persons. This might be used where a person desires to obtain BSE protection for phrases and terms that are new and/or that may acquire significant meaning prior to obtaining legal protection, or where legal protection is otherwise unavailable. It is possible that the BSE could be designed to provide protection beyond the scope of protection allowed under various legal systems. For example, an individual might decide to create a new term or phrase and agree, prior to publicizing that term or phrase, with various BSE Search Companies to have EIPs or other protections related to such term or phrase.

Example 7

Use of BSE Terms by Groups of Vendors or Industries

New or existing trade associations may be formed among various trade groups or service or product industries that may at least partially determine within that group that only certain BSE Search Companies and/or subsets of BSE Search Companies that recognize certain Brands or terms or utilized certain agreed-upon BSE Algorithms may be used. The participating BSE Search Companies may be designed to utilize special algorithms for certain terms and/or utilize EIPs for certain terms, or that the rules, EIPs, etc. may only apply to BSE Searches conducted within a specific group of Searches, whether or not such terms are otherwise entitled to legal protection. This may be done to protect economic rights of the various members, to ensure consistent user experiences and the efficacy of the systems, or a combination of these or other objectives.

Example 8

Use of BSE Terms to Designate Types of Searches Vs. Intended Search Results

In the foregoing Example 7, the groups or industries might agree upon certain terms to designate certain types of searches (e.g. the term UPC would only be used to designate a Universal Product Code) that would only yield search results for the appropriate products, and provide that any Brandbidder or Content provider utilizing that term would have to agree that only products conforming to the appropriate UPC would be associated with the use of that term IF the UPC code was included in the Search Term. Similarly, various groups might designate that the utilization of a certain code in the Search Term would automatically designate a certain type of search, say a local search for a real world destination (vs. intangible information or websites or online storefronts). As in the situation described in Example 6, these BSE search terms and the BSE Search Algorithm utilized by the BSE Search Engines could be utilized for purposes of protecting or enhancing the economic rights of the various members of the groups or to ensure consistent user experiences and the efficacy of the systems, or a combination of these or other objectives.

Example 9

Allocating EIPs for Related Searches among Various Parties

In addition to EIPs from BSE Search Companies to Brandholders, BSE Search Engines may provide for allocating BSE Search Revenues among multiple recipients, or allocating and prioritizing Search Results for multiple BSE Searches among various Brandholders proportionately, pursuant to certain business rules, or as otherwise agreed by BSE Search Companies and Brandholders.

Example 10

BSE Search Engines Business Rules Regarding Brands

BSE Search Engines might provide that bidders for certain terms meet certain monetary or non-monetary requirements or authorizations or potentially are required to bid "extra" to be able to bid on search terms including certain names of associated celebrities that might be associated with a particular product or service. For example, the term "Madonna Ringtones" may be treated by the BSE Search Company so that a Bidder on this term would be required to demonstrate either that they a) sold Madonna Ringtones and were authorized by Madonna to sell Madonna Ringtones and/or b) paid a one-time, periodic or other fee (included in or separate from the bid for the bidded search term) to use the term "Madonna," and agree to certain limitations regarding such use, and the BSE Search Engine may agree to make a special EIP to the celebrity "Madonna," and/or the BSE may set certain minimums for the inclusion of the term Madonna, in a Paid Search term including "Madonna Ringtones" depending on whether or not the bidder met the criteria under clause (a) above.

Example 11

Use of BSE System and Rules beyond Internet Searches

The BSE Search systems and rules may be extended to other media and search ecosystems, for example, a bidded or quasi-bidded BSE may be used to determine the prioritization and display of Advertising and/or Content that may be displayed or otherwise shown on Internet pages, other digital media, including radio, TV, digital billboards, and other broadcast media. In such event, EIPs and other BSE Incentives may be paid to the companies displaying such Content or otherwise used in connection with the prioritization of the display of such other advertising, media, search results, or placements. For example, radio stations may ultimately play songs, and televisions stations or Internet video sites may ultimately make available and/or display songs, audio, commercials or other Content, based on BSE Incentives including EIPs for both Advertising and the Content. In such event, the EIPs and BSE Incentives may be used to determine or incentivize placement and/or provide economic and non-economic incentives to media companies, content owners or others for the display, sale, or other use or presentation of such Content or advertisements or Search Results.

Example 12

Associations of BSE Search Engines may Establish Common Rules

One or more BSE Search Engines might group together to provide for the economic and non-economic BSE Incentives described herein, and/or form organizations to assist in the establishment and promotion of certain common rules, systems, and procedures for operating BSE's vis-à-vis Brandholders, Brandbidders, and end users.

Example 13

Use of Committees, Board, Arbiters, and Quasi-judicial and Other Procedures for BSE Governance The BSE Search Companies, Brandholders, and/or Brandbidders may form various associations, committees, boards, or arbitration processes for the establishment, monitoring, and/or interpretation of legal or other rules, systems, and procedures under one or more BSE Search Companies or the resolution of any disputes related thereto.

These groups or systems may be given the authority to adjust BSE algorithms, priorities of display, EIPs, etc., including monetary adjustments that may be applied retroactively or prospectively, whether settled through immediate payment or adjustment in future EIPs, ratios, etc., in order to allocate BSE EIPs and ensure the integrity of the Brand Search Ecosystem.

Example 14

Use of EIP Clearinghouses

One or more BSE Search Companies may form various accounting and tracking systems and procedures (a "BSE Clearinghouse") for establishing, monitoring, tracking, accounting for, clearing, and/or paying EIPs to participating Brandholders, Brandbidders, etc. on an automated or semi-automated basis. These BSE Clearinghouse systems could track all of the attributes related to the establishment and operation of BSE Incentives, the BSE Algorithms, etc. and provide interfaces for various BSE participants to interact with, obtain reports or payments from, and otherwise track their BSE accounts.

Example 15

Basing BSE Incentives to Brandbidders on Various Attributes of Brandbidders The nature and amount of BSE Incentives, including EIPs, may be based on categorization of Authorized Bidders by various attributes, e.g., by geography, status, the volume of sales of the Brandholder's products or other products, the nature of the various goods and services sold by the Brandbidder (e.g., whether or not the Brandbidder carried and sold competing products), and/or any other characteristic, or even subjective or random characterization (e.g., Tier 1, Tier 2, Group A, Group B, and the like) for testing purposes. A BSE may utilize formulaic or non-formulaic rules and calculations related to the activities of Brandholders and Brandbidders, including the retroactive application of rules or formulas based on subsequent events.

For example, the Brandholder may agree to provide an EIP to a Brandbidder ranging from ten to twenty dollars ($10.00-$20.00), depending on the sales volume achieved by the Brandbidder throughout a specific period (e.g., one year) in the aggregate or based upon certain types of products. In addition or alternatively, a Brandbidder that carried numerous competing brands may be paid an EIP from Brandholder X based on the ultimate ratio of sales of Brandholder X's products vs. sales of competing Brandholders' products. In addition, if the formulas or factors which impact the EIP are based in whole or in part on information that is confidential to the Brandbidder and Brandholder, the BSE and the BSE Clearinghouse may be used as an independent third party provider or method of determining and certifying the information used for EIP payment calculations on a confidential, or "blind" basis to protect the confidential nature of the information.

As an illustration, a Tier 1 car dealer may be paid an EIP of ten dollars ($10) from the Brandholder on a bid for a particular Brand, provided that the dealer achieved certain minimum sales volumes, but the EIP may be reduced proportionately by the percentage of unit or dollars sales volume of the dealer to the extent that such sales volume related to the Brandholder's brands was below fifty percent (50%) of all of the dealers sales, or of all sales of certain competing or non-competing products.

Example 16

Categorization of Search Results Based on BSE Systems

BSE Search Companies may adjust their Search Algorithms to provide that Brands and Search Results related to Brands and/or Brandbidders appear first in Search Results and are categorized as BSE Search Results specifically, or appear based on other forms of categorization, segmentation, and/or prioritization of BSE Search Results. This may be applied to both Paid Search Results and Organic Search Results. BSE Search Results for branded terms may be segregated from non-branded search results, whether separately labeled or not, or otherwise treated differently based on the characterization of the Brand, the amounts bid, EIPs, and/or other attributes of brands.

Example 17

Use and Designation of Authorized Coupons in BSE Results

BSE Search Engines may utilize BSE Algorithms to deliver BSE Search Results for various products and services, or various marketing and promotional terms or techniques, such as coupons, discounts, specials, and the like, to help provide more relevant responses to Branded Search Requests, or to adequately differentiate between such techniques being offered by the holders of Brands, Authorized Brandbidders, or unauthorized Brandbidders. For example, a specialized BSE Search Company may be formed exclusively for providing coupons, promotions, rebates, and/or discounts authorized by Brandholders and offered exclusively over one or more BSE Search Engines.

Example 18

Using BSE Incentives to Incent Brandholders to Provide Better Information

BSE Search Companies may pay or otherwise use BSE Incentives or other aspects of the BSE to incent Brandholders and others to provide better information for Search Results. For example, BSE Search Companies may agree to pay an EIP to a Brandholder who agrees to provide the BSE Search Engine with the UPC for all of the Brandholder's goods and services and/or to provide to the BSE searchable versions of the operating or service manuals for all of the Brandholder's products. In this case, the EIP may provide the only monetary incentive for the Brandholder to undertake the acquisition, management, and/or dissemination of such information and provide valuable benefits to the BSE Search Engine and their users.

Example 19

Modifying the BSE Algorithms to Reflect User Feedback and Votes

The BSE Search Companies may agree with Brandholders or otherwise to modify their BSE Algorithms to take user feedback, ratings, and input on Brands, Branded Products, and/or Brandbidders into consideration for the inclusion and prioritization of BSE Search Results, and the EIPs may be determined, allocated, or otherwise impacted by such user information or feedback.

Example 20

Allocating EIPs to End Users

The BSE Search Companies may determine to track and provide BSE Incentives, EIPs, and Non-Economic Incentives to Internet Users who use BSE Search Engines and/or frequent Brandholders or Authorized Brandbidders sites, thereby encouraging the use of the BSE Search Engines to the benefit of Brandholders, Brandbidders and end users.

Example 21

Use of BSE Clearinghouse to Enforce BSE Terms and Agreements

The BSE Search Companies may determine to reduce EIPs and other BSE Incentives to parties participating in the system that abuse or fail to comply with the various rules, guidelines, and/or procedures of the BSE, and the BSE Search Companies may withhold various amounts otherwise payable under the BSE Systems pursuant to rules, regulations, and/or agreements of the BSE either to provide economic disincentive for Brandbidders that fail to comply or to provide adequate funding for various BSE processes and procedures.

Additional terms used in provisional application Ser. No. 60/744,804 may be applicable and are expressly incorporated herein unless already defined elsewhere herein, such as Content, Search Engines, Search Companies, Internet Search, Internet Users, Search Results, Search Terms, Affiliates, Monetizable Actions, Websites Operators, Local Searches, PCs, Non-PC Devices, Paid Search Results, Search Logic Terms, Search Algorithms, SEOs, Paid Advertising, Bidders, Pay for Performance Advertising, Pay for Inclusion, SEO, SEM, Arbitrageurs, Brandholders, Brands, Branded Products.

While traditional Internet Searches have been the catalyst for a large number of instances of displaying and communicating Content over the Internet and the systems and methods described herein may be included in such traditional search systems, there are many other instances where the concepts, processes, nuances, procedures, and results applicable to Internet Searches described herein may apply to the communication of Content over the Internet or any other medium in the absence of an Internet Search.

While the economics of Internet Search Results, particularly Paid Search Results, are driving a tremendous amount of investment and development in Internet Searches, the concept of Paid Search may expand beyond the delivery of Content as a result of Internet Searches and be applied in the context of the display, delivery and/or other communication (e.g., broadcast or narrow cast of audio or video) of numerous forms of Content that are unrelated to Internet Searches, yet may be impacted significantly by many of the processes and procedures related to Internet Searches and described and/or suggested herein, particularly those related to Paid Searches and the BSE Incentives, including EIPs, associated with Paid Searches.

In addition to Paid Advertising and Paid Search Results, Content may be displayed in the absence of Search Results or Advertising across any form of media—Internet or otherwise—and it is expected that many of the systems and methods described herein, e.g., for determining the display of Content on the Internet, may migrate into other media for the display of Content. In these situations, Media companies may utilize many of the methodologies described herein to determine which Content to display to certain users on certain devices in certain contexts, and the order and nature of the display and/or other communication of such Content may be determined by methods analogous to the methods for displaying Content related to Internet Searches, and therefore many of the products and services, systems and methods described herein in connection with Internet Searches may become relevant in the context of the display and communication of Content that is not related to Internet Searches.

It will be appreciated that elements or components shown with any embodiment herein are exemplary for the specific embodiment and may be used on or in combination with other embodiments disclosed herein. Additional information regarding apparatus, systems, and methods for practicing the present invention may be found in co-pending application Ser. No. 11/156,875, filed Jun. 17, 2005, the entire disclosure of which is expressly incorporated by reference herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A method for protecting, enhancing, and leveraging brand property rights of brandholders in their brands and branded products in connection with providing search results by establishing a brand name database comprising a plurality of brands owned or controlled by respective brandholders and brandbidder information and content of authorized brandbidders seeking placement of the brandbidders' information and content in search results, and a search engine communicating with the brand name database for receiving and responding to brand search requests via a network, the brandbidder information including authorized brandbidder information and content, the method performed by one or more computer systems programmed to perform the steps of:

receiving, at the one or more computer systems, brandholder requests from brandholder computing devices via the network to link the brandholders with respective brands in the brand name database;

applying business rules of the brand name database using the one or more computer systems to the brandholder requests to link the brandholders with respective brands;

receiving, at the one or more computer systems, a brandbidder request from a brandbidder computing device via the network to have the brandbidder's information associated with a brand in the brand name database such that search results responsive to brand search requests including the brand include the brandbidder's information and content; and receiving real-time communication from the brandholder linked to the brand, via the one or more computer systems, confirming that the brandbidder qualifies as an authorized brandbidder, the brandholder providing input to the search engine in order to improve or enhance search results including the authorized brandbidder's information and content that is provided to consumer computing devices in response to brand search requests including the brand to thereby protect, leverage, or enhance property rights of the brandholder in the brand in connection with providing the search results, the method further comprising:

receiving a search request from a user computing device, the search request including a brand; and providing search results to the user computing device, the search results enhanced by the input from the brandholder of the brand, wherein the search results are enhanced by limiting or establishing an order of items included in the search results.

2. The method of claim 1, wherein the input provided by the brandholder comprises providing an economic incentive payment to each bid of the authorized brandbidder to effectively increase the bid of the authorized brandbidder to improve ranking of the authorized brandbidder's information and content relative to brandbidder information and content of unauthorized brandbidders included in the search results.

3. The method of claim 2, further comprising providing economic incentive payments related to one or more bid transactions to brandholders after processing brand search requests including brands owned or controlled by the respective brandholders.

4. The method of claim 3, wherein the economic incentive payments are based at least in part on revenues derived from search terms including the brands owned or controlled by the respective brandholders when the brand search requests are received by the search engine.

5. The method of claim 3, wherein the economic incentive payments are processed by a clearing house independent from the search engine.

6. The method of claim 1, wherein the search results are improved or enhanced solely by or with reference to at least one of input or information either previously provided or provided in real-time from the brandholder.

7. The method of claim 1, wherein the search results are improved or enhanced based at least in part on at least one of input or information previously provided or provided in real-time from the brandholder.

8. The method of claim 1, wherein the input provided by the brandholder further comprises providing input in the business rules of the brand name database that affect brandbidders and their association with respective brands in the brand name database.

9. The method of claim 1, wherein search results presented are determined based at least in part on one or more of: the business rules of the brand name database; identification of a platform through which the search requests were submitted; search terms included in the search requests; a time of day when the search requests were submitted; historically tracked searches and clicks of users submitting the search requests; immediate past searches and clicks of users submitting the search requests; contextual information related to the search requests; history of users submitting the search requests; qualifications of users submitting the search requests to receive loyalty incentives provided by the brandholder; and the nature of the content related to the search requests.

10. The method of claim 1, wherein search results are determined and improved or enhanced, in real-time, at least in part by a determination as to whether users submitting search requests are members of a loyalty or incentive program provided by the brandholder as deemed relevant to the users' search requests.

11. The method of claim 1, wherein the input from the brandholder further comprises the brandholder electing to improve and enhance search results that are to be returned by the search engine for the brand with content based upon at least one of: the business rules of the brand name database; identification of a platform through which the search requests were submitted; additional search terms in the search requests; time of day when the search requests were submitted; historically tracked searches and clicks of users submitting the search requests; immediate past searches and clicks of users submitting the search requests; contextual information related to the search requests; history of users submitting the search requests; qualifications of users submitting the search requests to receive loyalty incentives; the nature of content related to the search requests.

12. The method of claim 1, wherein one or more keyword triggers configurable by the brandholder influence the responsive search results returned to a user making a search request comprising search terms and the one or more keyword triggers.

13. The method of claim 1, wherein the business rules of the brand name database include limiting access, such that the brandholder or a third-party web site authorized by the brandholder contains crawlable data or data accessible in real-time, and further, wherein access to the crawlable data or the data accessible in real-time is limited only to authorized third parties seeking to access the crawlable data or the data accessible in real-time, based upon rules and settings as determined by the brandholder.

14. The method of claim 1, wherein search results are determined, in real-time, based at least in part by a modality on a device used to submit the search requests, the device comprising at least one of a phone; a TV; an internet device; a kiosk; a device used in connection with commercial transportation; and a device using speech recognition.

15. A system for protecting, enhancing, and leveraging brand property rights of brandholders in their brands and branded products in connection with providing search results, the system comprising:
  a computer system configured to operate a brand name database comprising a plurality of brands owned or controlled by respective brandholders and brandbidder information and content of authorized brandbidders seeking placement of the brandbidders' information and content in search results;
  a search engine communicating with the brand name database for receiving and responding to brand search requests via a network, the brandbidder information including authorized brandbidder information and content,
  the computer system configured to operate a clearing house for implementing business rules of the system; and
  one or more communication interfaces that:
  receive brandholder requests from brandholder computing devices via the network to link the brandholders with respective brands in the brand name database;
  apply the business rules of the brand name database to the brandholder requests to link the brandholders with respective brands;
  receive a brandbidder request from a brandbidder computing device via the network to have the brandbidder's information associated with a brand in the brand name database such that search results responsive to brand search requests including the brand include the brandbidder's information and content;
  receive real-time communication from the brandholder linked to the brand confirming that the brandbidder qualifies as an authorized brandbidder, the brandholder providing input to the search engine in order to improve or enhance search results including the authorized brandbidder's information and content that is provided to consumer computing devices in response to brand search requests including the brand to thereby protect, leverage, or enhance property rights of the brandholder in the brand in connection with providing the search results receive a search request from a user computing device, the search request including a brand; and provide search results to the user computing device, the search results enhanced by the input from the brandholder of the brand.

16. The system of claim 15, wherein the computer system is configured to improve or enhance the search results provided based at least in part on at least one of input or information previously provided or provided in real-time from the brandholder.

17. The system of claim 15, wherein the computer system is configured to determine the search results provided based at least in part by one or more of: the business rules of the brand name database; identification of a platform through which the search requests were submitted; search terms included in the search requests; a time of day when the search requests were submitted; historically tracked searches and clicks of users submitting the search requests; immediate past searches and clicks of users submitting the search requests; contextual information related to the search requests; history of users submitting the search requests; qualifications of users submitting the search requests to receive loyalty incentives provided by the brandholder; and the nature of the content related to the search requests.

18. The system of claim 15, wherein the computer system is configured to determine the search results provided, in real-time, based at least in part on a modality of a device used to submit the search requests, the device comprising at least one of a phone; a TV; an internet device; a kiosk; a device used in commercial transportation; and a device using speech recognition.

19. A non-transitory computer program product loadable into internal memory of one or more computer systems to protect, enhance, or leveraging brand property rights of brandholders in their brands and branded products in connection with providing search results by establishing a brand name database comprising a plurality of brands owned or controlled by respective brandholders and brandbidder information and content of authorized brandbidders seeking placement of the brandbidders' information and content in search results, and a search engine communicating with the brand name database for receiving and responding to brand search requests via a network, the brandbidder information including authorized brandbidder information and content, the computer program product comprising instructions that, when executed by the one or more computer systems cause the one or more computer systems to:

receive, at the one or more computer systems, brandholder requests from brandholder computing devices via the network to link the brandholders with respective brands in the brand name database;

apply business rules of the brand name database using the one or more computer systems to the brandholder requests to link the brandholders with respective brands;

receive, at the one or more computer systems, a brandbidder request from a brandbidder computing device via the network to have the brandbidder's information associated with a brand in the brand name database such that search results responsive to brand search requests including the brand include the brandbidder's information and content;

receive real-time communication from the brandholder linked to the brand, via the one or more computer systems, confirming that the brandbidder qualifies as an authorized brandbidder, the brandholder providing input to the search engine in order to improve or enhance search results including the authorized brandbidder's information and content that is provided to consumer computing devices in response to brand search requests including the brand to thereby protect, leverage, or enhance property rights of the brandholder in the brand in connection with providing the search results;

receive a search request from a user computing device, the search request including a brand; and provide search results to the user computing device, the search results enhanced by the input from the brandholder of the brand.

20. The computer program product of claim 19, wherein search results presented are determined based at least in part one or more of: the business rules of the brand name database; identification of a platform through which the search requests were submitted; search terms included in the search requests; a time of day when the search requests were submitted; historically tracked searches and clicks of users submitting the search requests; immediate past searches and clicks of users submitting the search requests; contextual information related to the search requests; history of users submitting the search requests; qualifications of users submitting the search requests to receive loyalty incentives provided by the brandholder; and the nature of the content related to the search requests.

21. A method for providing search results to users searching branded products and services by establishing a brand name database comprising a plurality of brands owned or controlled by respective brandholders and brandbidder information and content of authorized brandbidders seeking placement of the brandbidders' information and content in search results, and a search engine communicating with the brand name database for receiving and responding to brand search requests via a network, the brandbidder information including authorized brandbidder information and content, the method performed by one or more computer systems programmed to perform the steps of:

receiving, at the one or more computer systems, brandholder requests from brandholder computing devices via the network to link the brandholders with respective brands in the brand name database;

applying business rules of the brand name database using the one or more computer systems to the brandholder requests to link the brandholders with respective brands;

receiving, at the one or more computer systems, a brandbidder request from a brandbidder computing device via the network to have the brandbidder's information associated with a brand in the brand name database such that search results responsive to brand search requests including the brand include the brandbidder's information and content;

receiving a communication from the brandholder linked to the brand, via the one or more computer systems, confirming that the brandbidder qualifies as an authorized brandbidder, the brandholder providing input to the search engine in order to improve or enhance search results including the authorized brandbidder's information and content that is provided to consumer computing devices in response to brand search requests including the brand to thereby protect, leverage, or enhance property rights of the brandholder in the brand in connection with providing the search results;

receiving a search request from a user computing device, the search request including a brand; and providing search results to the user computing device, the search results enhanced by limiting or establishing an order of items included in the search results.

22. The method of claim 21, wherein the order is limited or established based at least in part on one or more of: an identity of the user submitting the search request; the business rules of the brand name database; identification of a platform through which the search request was submitted; search terms included in the search request; a time of day when the search request was submitted; historically tracked searches and clicks of the user; immediate past searches and clicks of the user; contextual information related to the search request; history of the user submitting the search request; qualifications of the user submitting the search request to receive loyalty incentives provided by the brandholder; and the nature of the content related to the search request.

23. The method of claim 21, wherein the search results are enhanced to improve ranking of the authorized brandbidder's information and content relative to brandbidder information and content of unauthorized brandbidders included in the search results.

* * * * *